(12) United States Patent
Bosworth

(10) Patent No.: US 10,658,805 B2
(45) Date of Patent: May 19, 2020

(54) MOUNTING ASSEMBLY FOR AN ELECTRICAL FIXTURE

(71) Applicant: Ideas to Action, LLC, Massillon, OH (US)

(72) Inventor: Peter A. Bosworth, Massillon, OH (US)

(73) Assignee: IDEAS TO ACTION, LLC, Massillon, OH (US)

( * ) Notice: Subject to any disclaimer, the term of this patent is extended or adjusted under 35 U.S.C. 154(b) by 0 days.

(21) Appl. No.: 16/313,536

(22) PCT Filed: Jun. 27, 2017

(86) PCT No.: PCT/US2017/039523
§ 371 (c)(1),
(2) Date: Dec. 27, 2018

(87) PCT Pub. No.: WO2018/005508
PCT Pub. Date: Jan. 4, 2018

(65) Prior Publication Data
US 2019/0229480 A1    Jul. 25, 2019

Related U.S. Application Data

(60) Provisional application No. 62/355,321, filed on Jun. 27, 2016.

(51) Int. Cl.
*H01R 4/56* (2006.01)
*H01R 33/76* (2006.01)
(Continued)

(52) U.S. Cl.
CPC ....... *H01R 33/7607* (2013.01); *H01R 13/506* (2013.01); *H01R 33/7664* (2013.01);
(Continued)

(58) Field of Classification Search
CPC .............. H01R 13/025; H01R 33/7607; H01R 33/7664; H01R 33/7685; H01R 13/6583; H01R 13/506; G01R 1/0433; H02G 3/18
(Continued)

(56) References Cited

U.S. PATENT DOCUMENTS 1,778,062 A   10/1930  Butzke
3,336,568 A   8/1967   Plus
(Continued)

OTHER PUBLICATIONS

International Search Report for the corresponding PCT Application; 15 pages.
GB 250,471 Patent Specification; 3 pages.

*Primary Examiner* — Jean F Duverne
(74) *Attorney, Agent, or Firm* — Black, McCuskey, Souers & Arbaugh, LPA

(57) ABSTRACT

A mounting assembly for an electrical fixture can include an upper unit and a lower unit that be releaseably retained together and including respective contacts that touch when the upper and lower units are retained together to create an electric pathway. The units can further include respective contacts for a neutral or ground connection. The assembly can also include a device in electrical contact with both of the contacts of the lower unit to draw power. The lower unit can also include a third contact and a power distribution circuit to deliver a level of electrical power to the third contact that is different than power available through the other contact of the lower unit. In a system of the mounting assemblies, each mounting assembly can include also include a transceiver to communicate with one another.

20 Claims, 22 Drawing Sheets

(51) Int. Cl.
*H01R 13/506* (2006.01)
*H02G 3/18* (2006.01)
*H01R 13/74* (2006.01)

(52) U.S. Cl.
CPC ........... *H01R 33/7685* (2013.01); *H02G 3/18* (2013.01); *H01R 13/748* (2013.01)

(58) Field of Classification Search
USPC ........................................................ 439/245
See application file for complete search history.

(56) References Cited

U.S. PATENT DOCUMENTS

| | | | | |
|---|---|---|---|---|
| 3,414,869 A | * | 12/1968 | Pascua | G01R 1/0433 |
| | | | | 439/381 |
| 6,010,369 A | * | 1/2000 | Itabashi | H01R 13/025 |
| | | | | 439/660 |
| 6,692,309 B1 | | 2/2004 | Kovacs | |
| 7,033,220 B1 | | 4/2006 | Yang | |
| 9,509,074 B2 | * | 11/2016 | Otsuta | H01R 13/6583 |

* cited by examiner

MOUNTING ASSEMBLY FOR AN ELECTRICAL FIXTURE

CROSS-REFERENCE TO RELATED APPLICATIONS

This application is a Continuation-in-Part and a National Phase filing of PCT/US17/39523, filed Jun. 27, 2017, which claimed priority to and the benefit of U.S. Provisional Patent Application No. 62/355,321, filed Jun. 27, 2016. The contents of both prior applications are hereby incorporated by reference in their entirety.

BACKGROUND

This relates in general to mounting of electrical fixtures. There are many known types of electrical fixtures that are mounted to structures, such as houses, buildings, and the like. Such fixtures include lighting fixtures, appliances (e.g. fans), low voltage equipment (e.g. smoke detectors), etc. Generally, when mounting these types of fixtures, the fixtures are electrically connected, such as to the structure's central power network or as part of a larger electrical system, such as an alarm system or other powered system. These fixtures are then typically secured mechanically to the structure either directly to support members or to other articles such as electrical boxes. When mounting, an installer often needs to support the electrical fixture while implementing the electrical connection(s), and subsequently attempting to mechanically align and secure the fixture. For larger fixtures, it may be desirable to utilize two or more installers.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A mounting assembly for an electrical fixture can include an upper unit and a lower unit. The upper unit can include a first portion of a detent mechanism and an upper contact for connection to a power source. The lower unit can be configured for connection to an electrical fixture and include a second portion of a detent mechanism and a lower contact for connection to the electrical fixture. When the lower unit engages the upper unit, the first portion and the second portion of the detent mechanism cooperate to releaseably retain the upper unit and the lower unit together and the upper contact and the lower contact touch to create an electric pathway between the power source and the electrical fixture. The upper unit further includes a second upper contact for a neutral or ground connection and the lower unit further includes a second lower contact for connection to the electrical fixture. When the lower unit engages the upper unit, the second upper contact and the second lower contact touch to create a second electric pathway between the ground or neutral and the electrical fixture. The mounting assembly can also include at least one device in electrical contact with both of the lower contact and the second lower contact. The at least one device can be configured to draw power through the upper contact and the lower contact.

A mounting assembly for an electrical fixture can include an upper unit and a lower unit. The upper unit can include a first portion of a detent mechanism and an upper contact for connection to a power source. The lower unit can be configured for connection to an electrical fixture and include a second portion of a detent mechanism and a lower contact for connection to the electrical fixture. When the lower unit engages the upper unit, the first portion and the second portion of the detent mechanism cooperate to releaseably retain the upper unit and the lower unit together and the upper contact and the lower contact touch to create an electric pathway between the power source and the electrical fixture. The upper unit further includes a second upper contact for a neutral or ground connection and the lower unit further includes a second lower contact for connection to the electrical fixture. When the lower unit engages the upper unit, the second upper contact and the second lower contact touch to create a second electric pathway between the ground or neutral and the electrical fixture. The lower unit can also include a third lower contact. The mounting assembly can also include a power distribution circuit disposed between the lower contact and the third lower contact. The power distribution circuit can be configured to deliver a level of electrical power to the third lower contact that is different than a level of electrical power received by the power distribution circuit from the upper contact through the lower contact.

A system of mounting assemblies for electrical fixtures can include a plurality of mounting assemblies. Each of the mounting assemblies can include an upper unit and a lower unit. The upper unit can include a first portion of a detent mechanism and an upper contact for connection to a power source. The lower unit can be configured for connection to an electrical fixture and include a second portion of a detent mechanism and a lower contact for connection to the electrical fixture. When the lower unit engages the upper unit, the first portion and the second portion of the detent mechanism cooperate to releaseably retain the upper unit and the lower unit together and the upper contact and the lower contact touch to create an electric pathway between the power source and the electrical fixture. The upper unit further includes a second upper contact for a neutral or ground connection and the lower unit further includes a second lower contact for connection to the electrical fixture. When the lower unit engages the upper unit, the second upper contact and the second lower contact touch to create a second electric pathway between the ground or neutral and the electrical fixture. Each mounting assembly can also include a transceiver drawing power through the upper contact and the lower contact. The plurality of mounting assemblies can be configured to communicate with one another through the respective transceivers.

BRIEF DESCRIPTION OF THE DRAWINGS

The detailed description set forth below references the following drawings:

FIG. 9a is a cross sectional view of the lower unit of FIG. 6 taken along line 9a-9a.

FIG. 10b is a side view of the locking slide of FIG. 10a.

FIG. 10c is an end view of the locking slide of FIG. 10a.

FIG. 11b is a side view of the upper contact of FIG. 11a.

FIG. 11c is a front view of the upper contact of FIG. 11a.

FIG. 12a is a top view of a lower contact of the lower unit of the assembly of FIG. 1.

FIG. 12b is a side view of the lower contact of FIG. 12a.

FIG. 12c is a front view of the lower contact of FIG. 12a.

FIG. 13a is a bottom view of the locking ring of the upper unit of the assembly of FIG. 1.

FIG. 13b is a side view of the locking ring of FIG. 13a.

DETAILED DESCRIPTION

Figure 1:
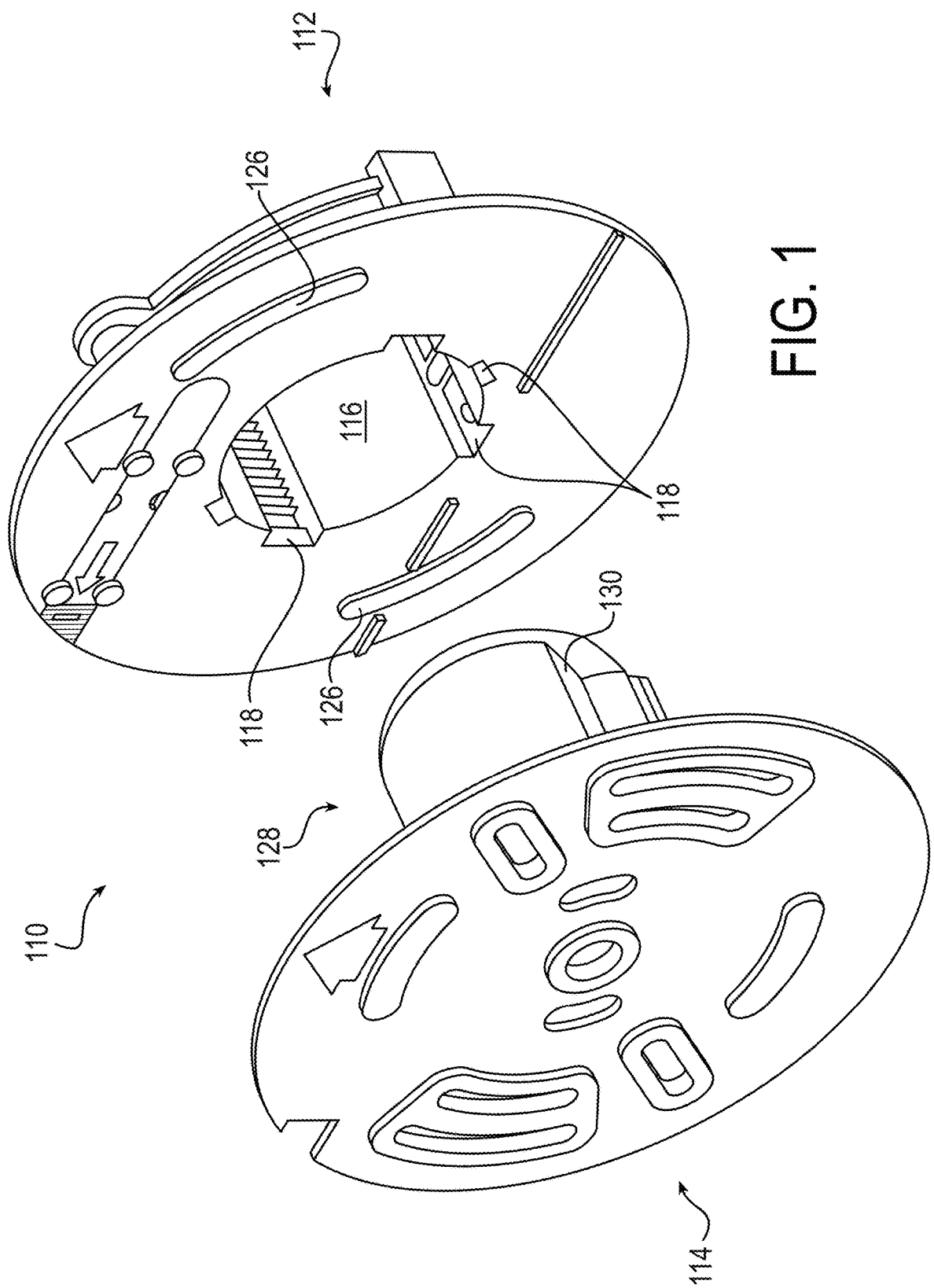
FIG. 1 is a perspective partially exploded view of a mounting assembly.
Figure 2:
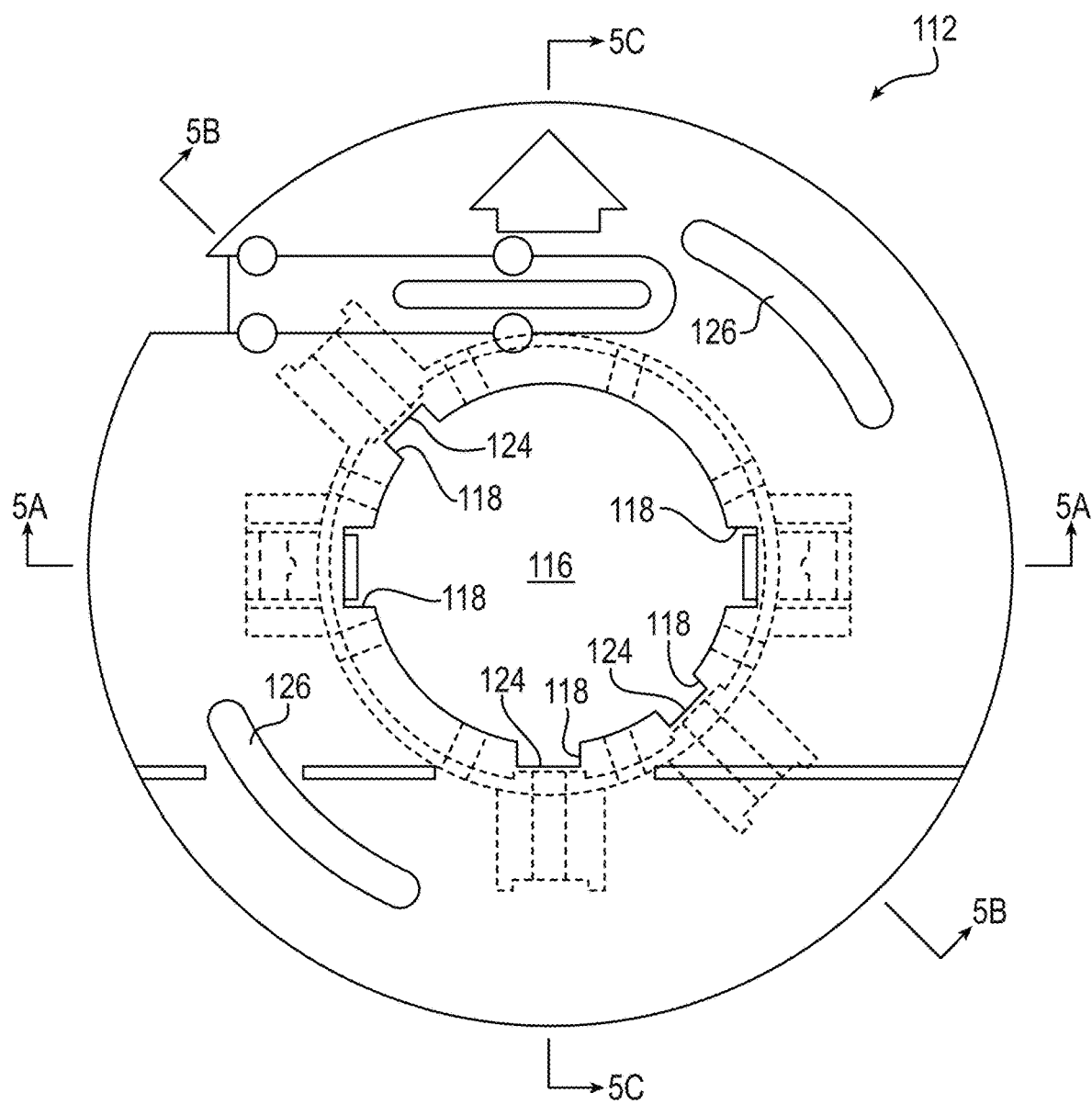
FIG. 2 is a bottom view of the upper unit of the assembly of FIG. 1.
Figure 3:
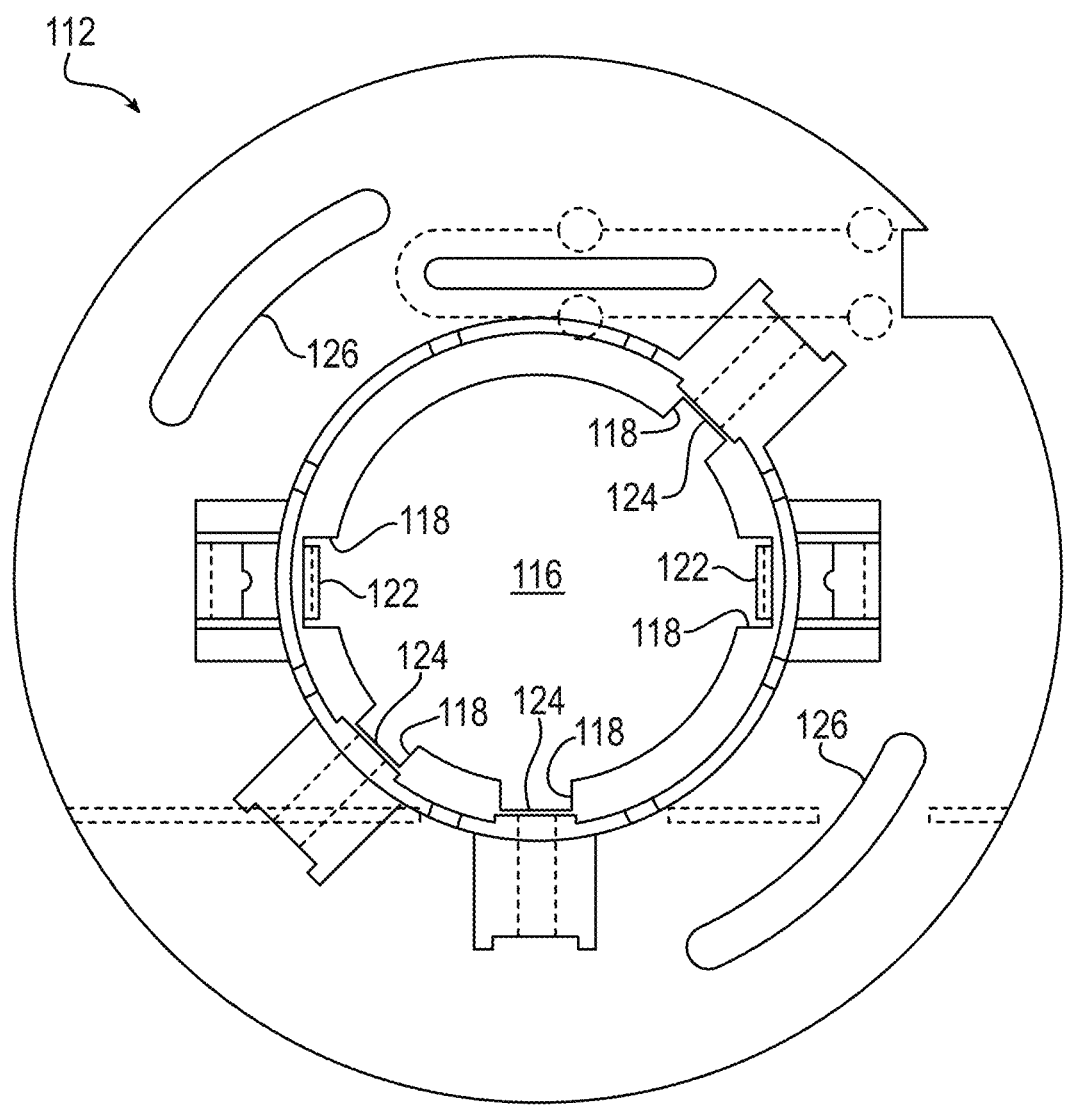
FIG. 3 is a top view of the upper unit of FIG. 2.
Figure 4:
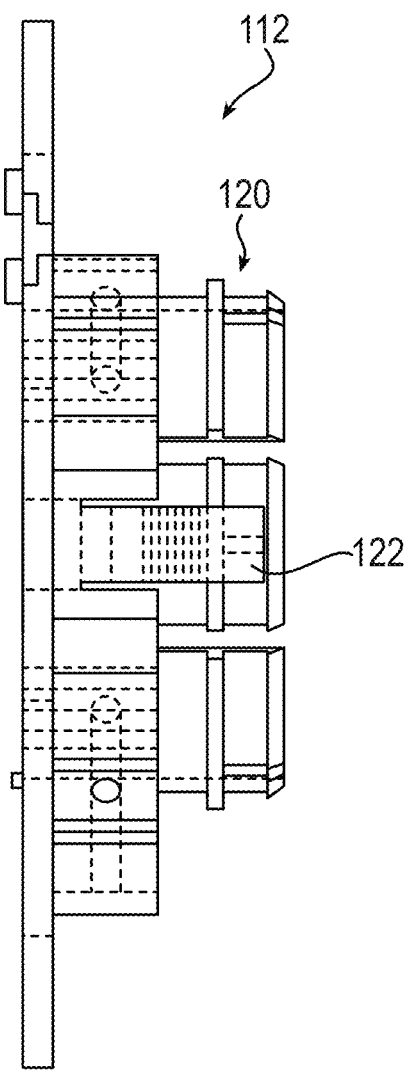
FIG. 4 is a side view of the upper unit of FIG. 2.
Figure 5C:
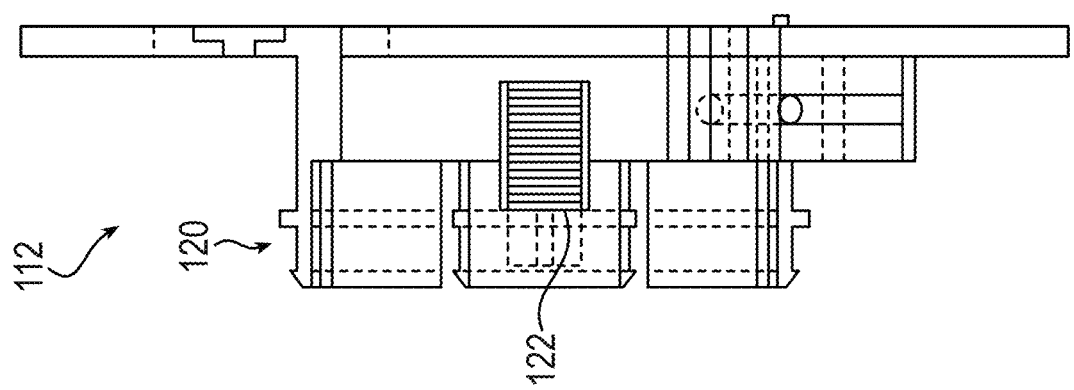
FIG. 5*c* is a cross sectional view of the upper unit of FIG. 2 taken along line 5*c*-5*c*.
Figure 5B:
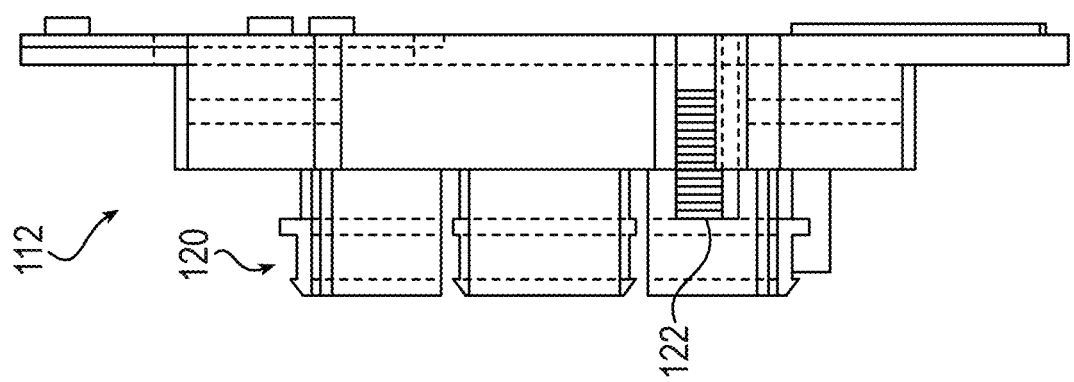
FIG. 5*b* is a cross sectional view of the upper unit of FIG. 2 taken along line 5*b*-5*b*.
Figure 5A:
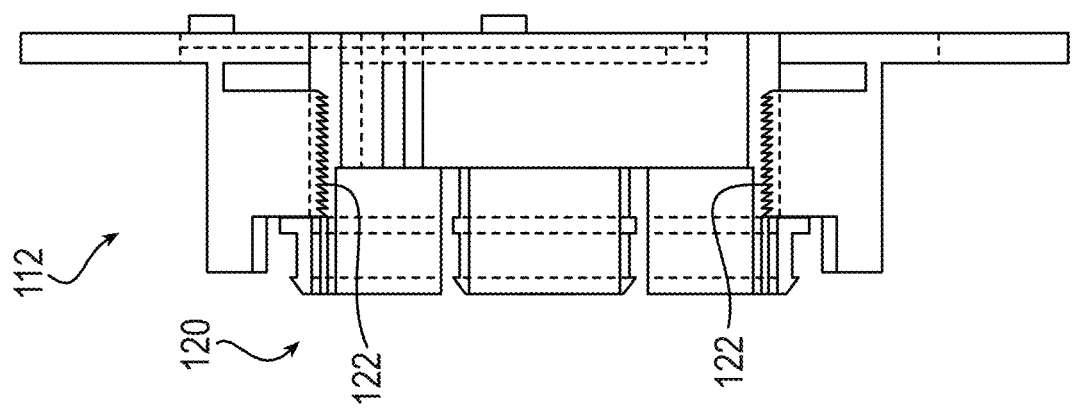
FIG. 5*a* is a cross sectional view of the upper unit of FIG. 2 taken along line 5*a*-5*a*.
Figure 6:
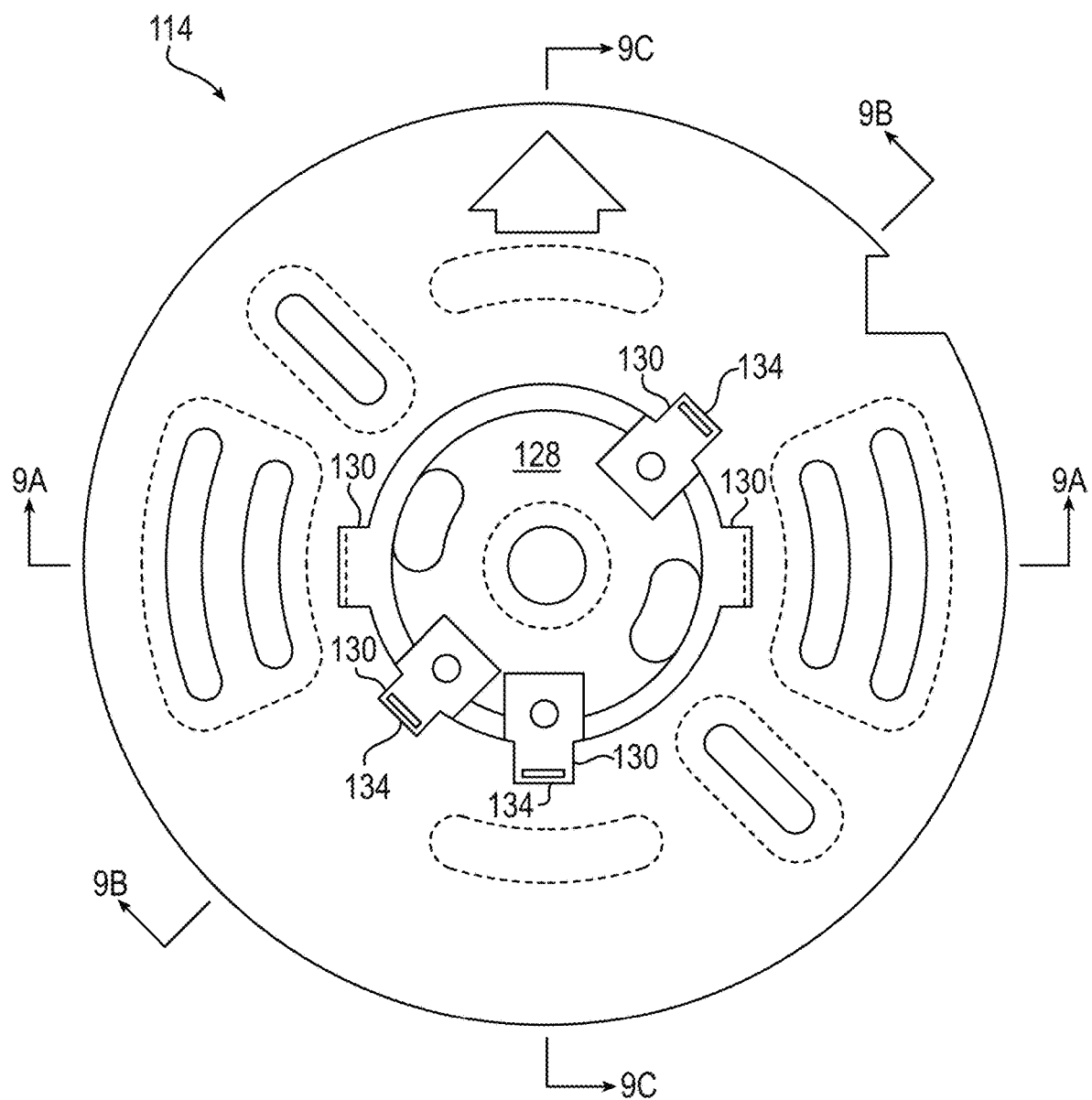
FIG. 6 is a top view of the lower unit of the assembly of FIG. 1.
Figure 7:
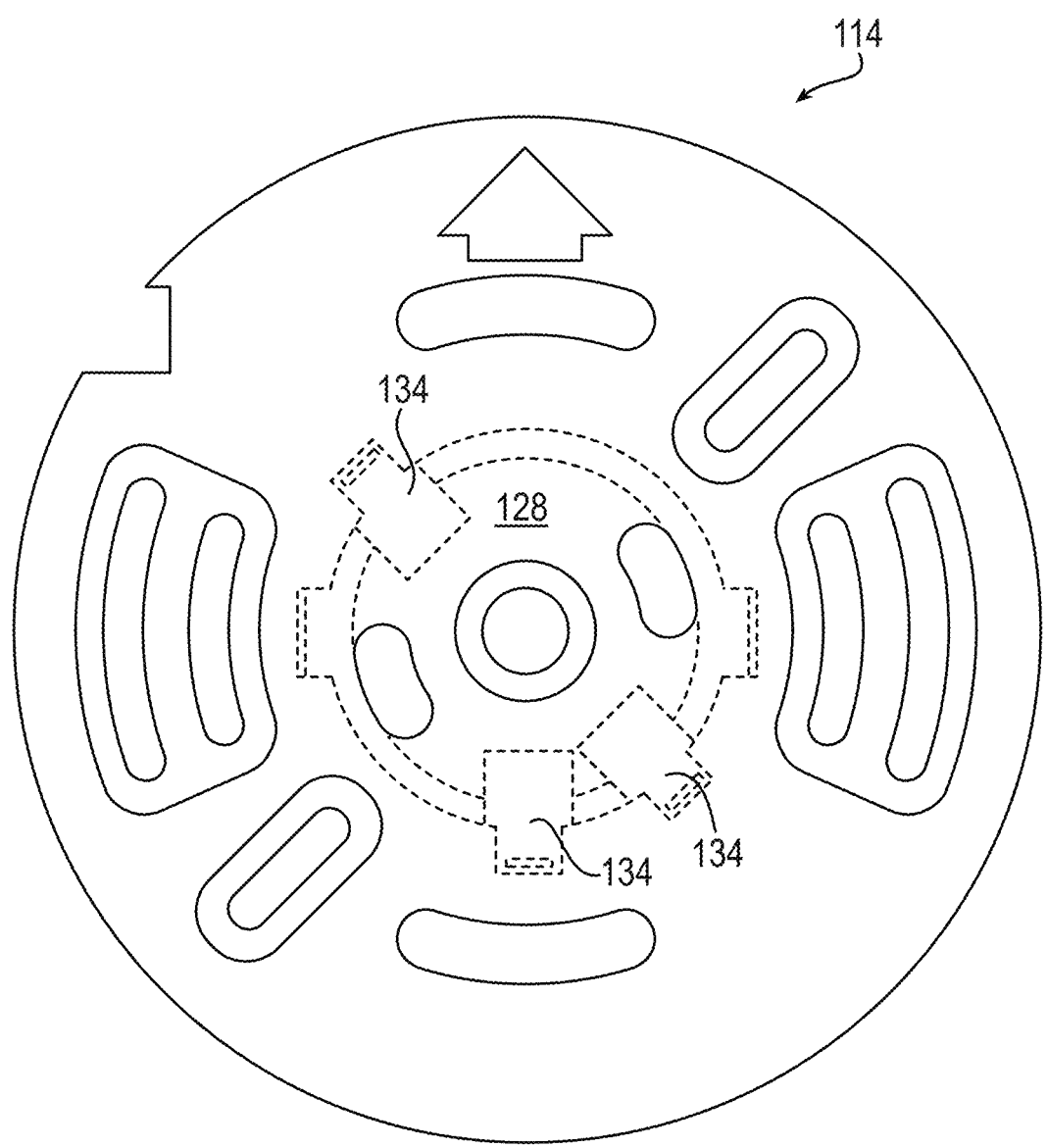
FIG. 7 is a bottom view of the lower unit of FIG. 6.
Figure 8:
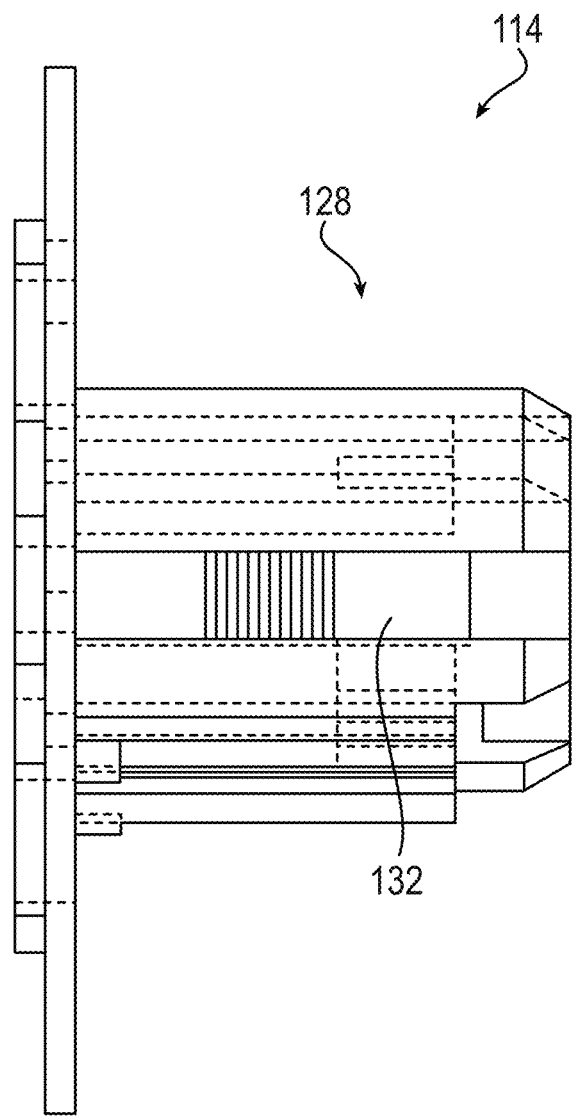
FIG. 8 is a side view of the lower unit of FIG. 6.
Figure 9B:
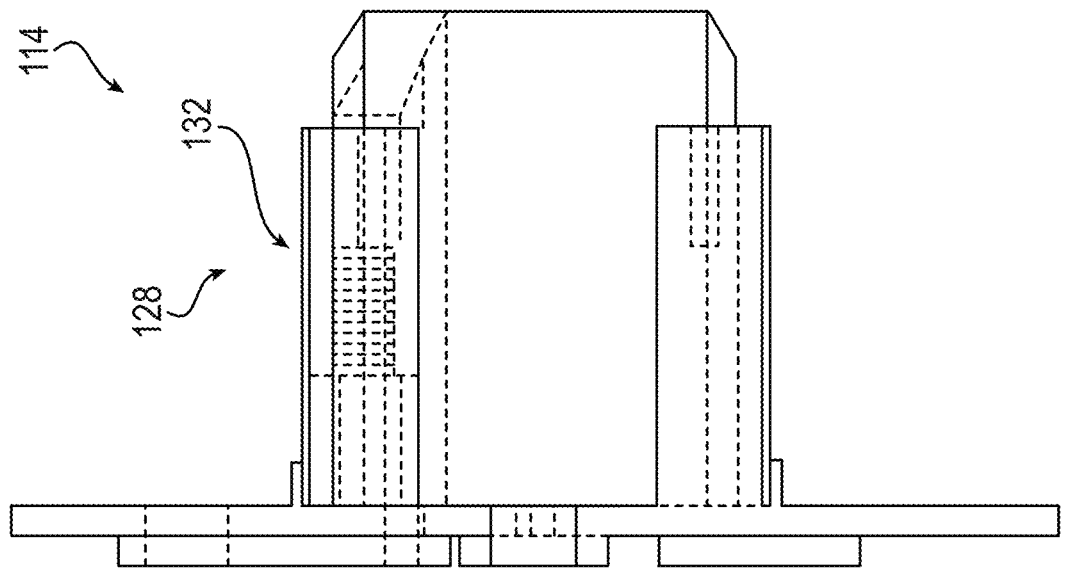
FIG. 9b is a cross sectional view of the lower unit of FIG. 6 taken along line 9b-9b.
Figure 9A:
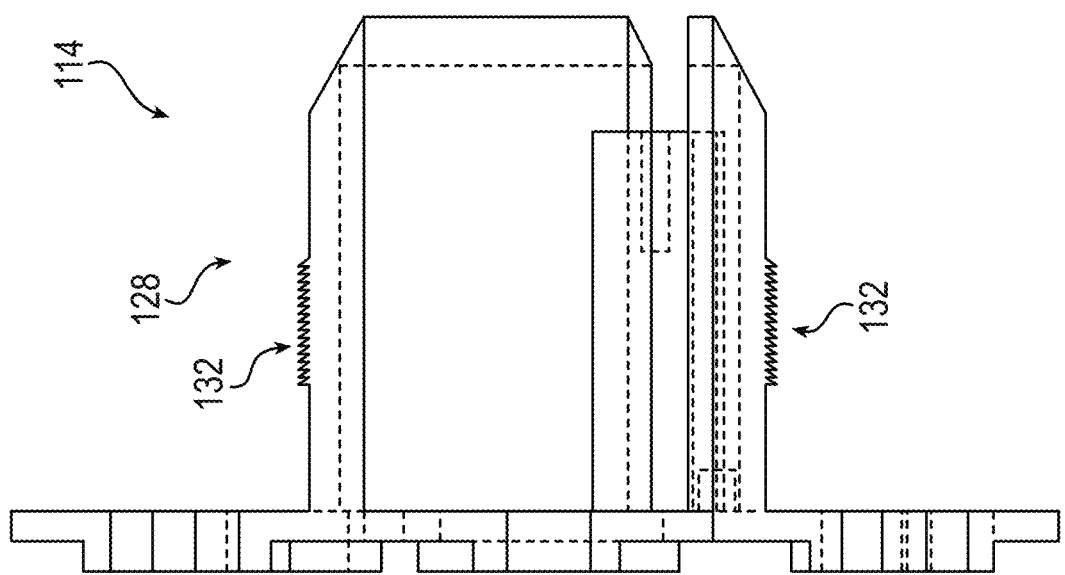
Figure 9C:
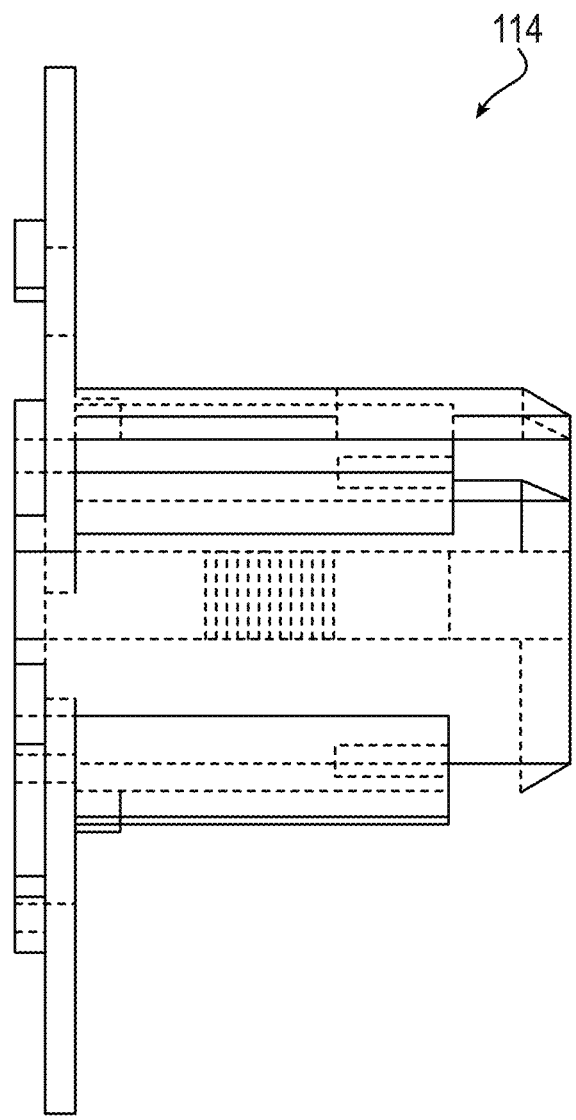
FIG. 9c is a cross sectional view of the lower unit of FIG. 6 taken along line 9c-9c.
Figure 10A:
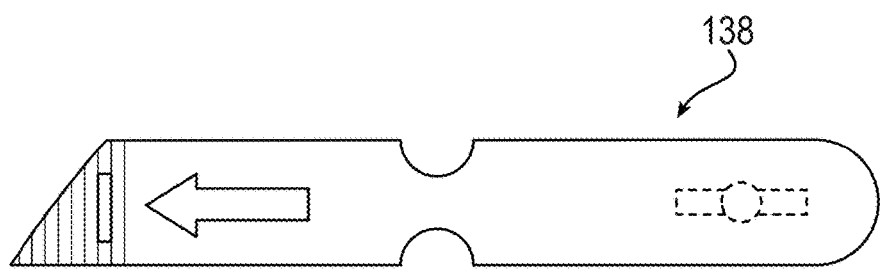
FIG. 10a is a bottom view of the locking slide of the upper unit of the assembly of FIG. 1.
Figure 10B:
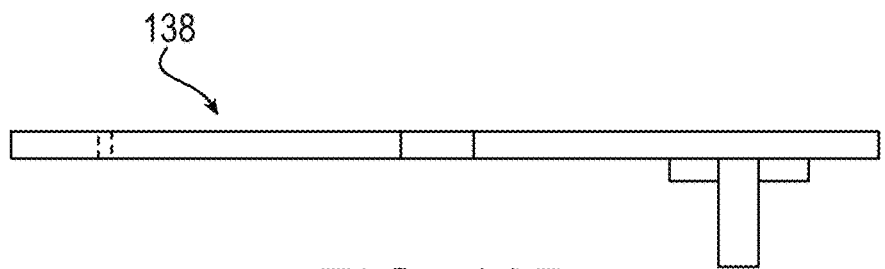
Figure 10C:
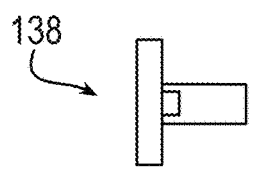
Figure 11A:
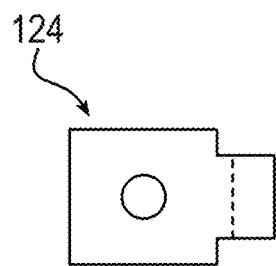
FIG. 11a is top view of an upper contact of the upper unit of the assembly of FIG. 1.
Figure 11B:
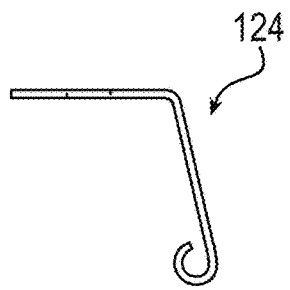
Figure 11C:
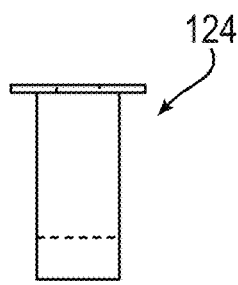
Figures 12A, 12B:
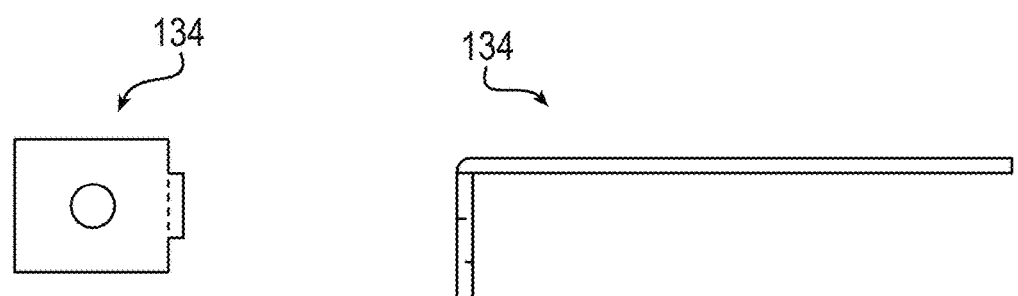
Figure 12C:
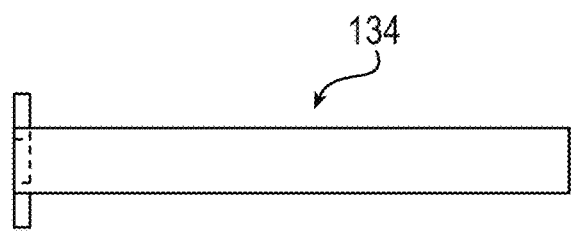
Figures 13A, 13B:
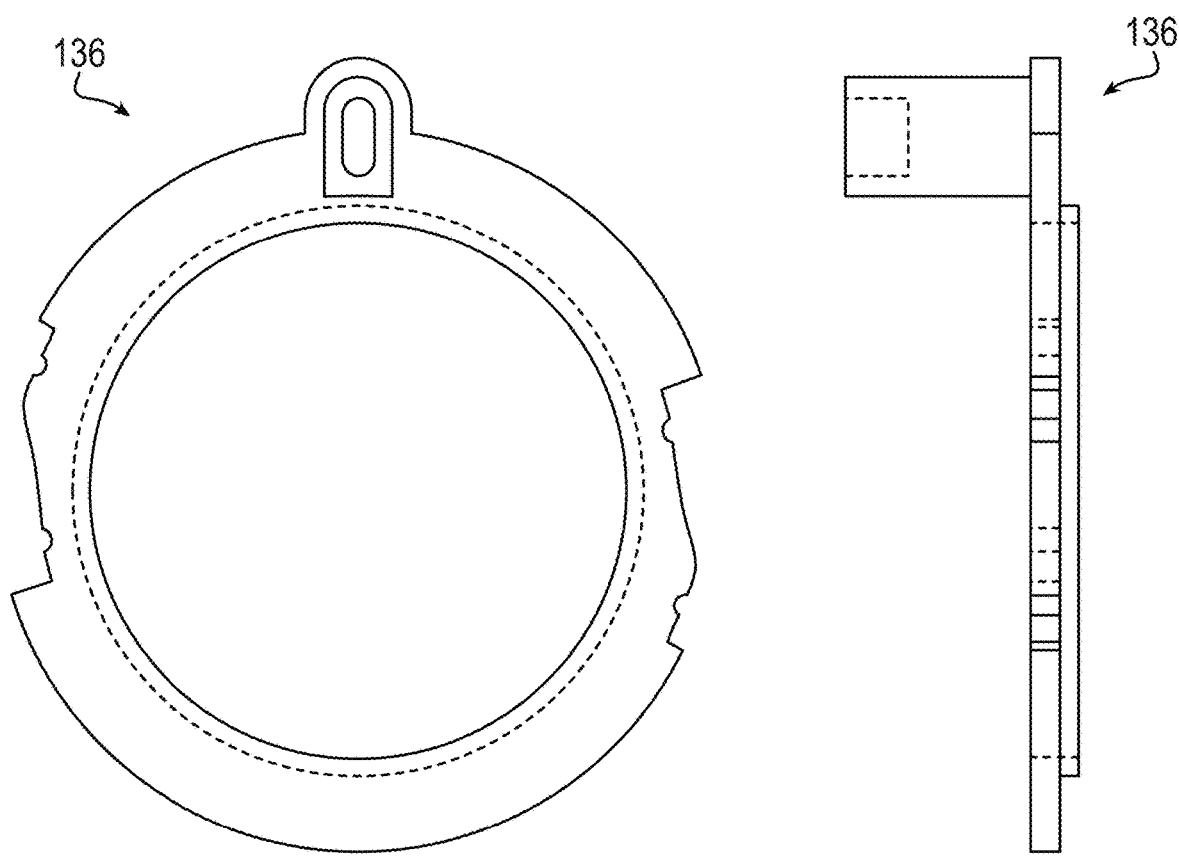

A plurality of different embodiments of the present disclosure are shown in the Figures of the application. Similar features are shown in the various embodiments of the present disclosure. Similar features have been numbered with a common two-digit reference numeral and have been differentiated by a third digit prefix placed before the two common digits. Also, to enhance consistency, the structures in any particular drawing share the same third digit prefix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or supplement other embodiments unless otherwise indicated by the drawings or this specification.

The present disclosure relates to a mounting assembly for an electrical fixture has an upper unit and a lower unit. The upper unit includes a first portion of a detent mechanism and an upper contact for connection to a power source. The lower unit is configured for connection to an electrical fixture and includes a second portion of a detent mechanism and a lower contact for connection to the electrical fixture. When the lower unit engages the upper unit, the first portion and the second portion of the detent mechanism cooperate to releasably retain the upper unit and lower unit together and the upper contact and lower contact touch to create an electric pathway between the power source and the electrical fixture.

The upper unit and the lower unit may be formed to couple in a male-female relationship. In a preferred embodiment, the upper unit is female and the lower unit is male. Preferable, electrical and mechanical connection between the upper and lower units may be achieved over a range of insertion depths. In at least one embodiment, the lower unit is formed in tapered male fashion to facilitate self-alignment when inserting into the upper unit formed in a female fashion. Electrical contact components may be keyed to insure proper matching of multiple connections.

The power source may be an AC power source or a DC power source.

The upper unit may be configured for connection to an electrical box.

The first portion of the detent mechanism may include at least one finger for engaging the second portion of the detent mechanism. The upper unit may include a collet ring that engages the at least one finger to maintain the retention of the upper unit and lower unit together. The upper unit may further include a locking slide to adjust the position of the collet ring and allow for the upper and lower unit to be disengaged via a mechanism accessible after installation.

The first and second portions of the detent mechanism may include cooperating teeth for retention of the upper unit and lower unit together, preferably over a range of insertion depths.

The upper unit may include multiple upper contacts for connection to the power source, to a neutral or return line, or to ground and the lower unit may include multiple lower contacts for connection to the electrical fixture that respectively touch each other to create electric pathways between the power source, the neutral or return line, or ground and the electrical fixture when the lower unit is in engagement with the upper unit.

The upper unit may include a longitudinal cavity and the lower unit may include a longitudinal protrusion. The longitudinal protrusion disposed within the longitudinal cavity when the upper unit and lower unit are retained together. One of the longitudinal protrusion and the longitudinal cavity may include one or more splines and the other of the longitudinal protrusion and the longitudinal cavity may include one or more grooves. The splines disposed within the grooves when the upper unit and lower unit are retained together.

The upper contacts and the lower contacts may be disposed on the splines or disposed in the grooves. Preferably, the splines and groves are oriented in a fashion to prevent mis-matching of electrical contacts when the lower and upper unit are engaged. The upper and lower contacts are preferably formed to maintain electrical connection over a range of insertion depths between the upper and lower unit.

The assembly may include a cap disposed adjacent to the upper unit and opposite the lower unit.

The assembly may include a spacer disposed between the lower unit and the electrical fixture.

Various aspects will become apparent to those skilled in the art from the following detailed description and the accompanying drawings. Referring now to the drawings, there is illustrated a mounting assembly 110 for an electrical fixture (not shown). The assembly 110 includes an upper unit 112 and a lower unit 114.

The upper unit 112 includes a longitudinal cavity 116, the purpose of which will be discussed below. The cavity 116 may be tapered along the longitudinal axis. The cavity 116 includes optional longitudinal grooves 118.

The upper unit 112 includes a first portion 120 of a detent mechanism, the purpose of which will be discussed below. The first portion 120 of the detent mechanism includes at least one finger 122.

The upper unit 112 includes at least one upper contact 124 for connection to a power source, a neutral or ground connection. The power source may be an AC power source or a DC power source.

The upper contacts 124 are illustrated as each being disposed in a respective groove 118.

The upper unit 112 is configured for connection to an electrical box, not shown. For example, the upper unit 112 includes apertures 126 configured for attachment to a corresponding electrical box or other mounting arrangement.

The lower unit 114 includes a longitudinal protrusion 128. The longitudinal protrusion 128 is disposed within the longitudinal cavity 116 when the upper unit 112 and lower unit 114 are retained together. The longitudinal protrusion 128 may be tapered.

The longitudinal protrusion includes optional splines 130. The spines are each disposed within a respective groove 118 when the upper unit 112 and lower unit 114 are retained together.

The lower unit 114 includes a second portion 132 of the detent mechanism. When the lower unit 114 engages the upper unit 112, the first portion 120 and the second portion 132 of the detent mechanism cooperate to releasably retain the upper unit and lower unit together, for example with a ratchet mechanism, such as an engaging tooth mechanism, or any other suitable mechanism to releasably retain the upper unit and lower unit together.

The lower unit 114 also includes at least one lower contact 134 for connection to an electrical fixture, not shown. When the lower unit 114 engages the upper unit 112 each upper contact 124 and lower contact 134 touch to create an electric pathway between the power source, neutral or ground and the electrical fixture.

As illustrated, each lower contact is disposed on a respective spline 130. However, it must be understood that the lower unit 114 may include grooves and the upper unit 112 may include splines with lower contacts disposed in grooves and upper contacts disposed on splines.

In the present example, when the upper unit 112 and the lower unit 114 are retained together the fingers 122 of the first portion 120 of the detent mechanism engage the second portion 132 of the detent mechanism. As illustrated, the first and second portions 120 and 132 of the detent mechanism include cooperating teeth for retention of the upper unit 112 and lower unit together 114.

A collet ring 136 engages at least one finger 122 to maintain the retention of the upper unit 112 and lower unit together 114. The assembly 110 also includes a locking slide 138 to adjust the position of the collet ring 136.

Figure 14:
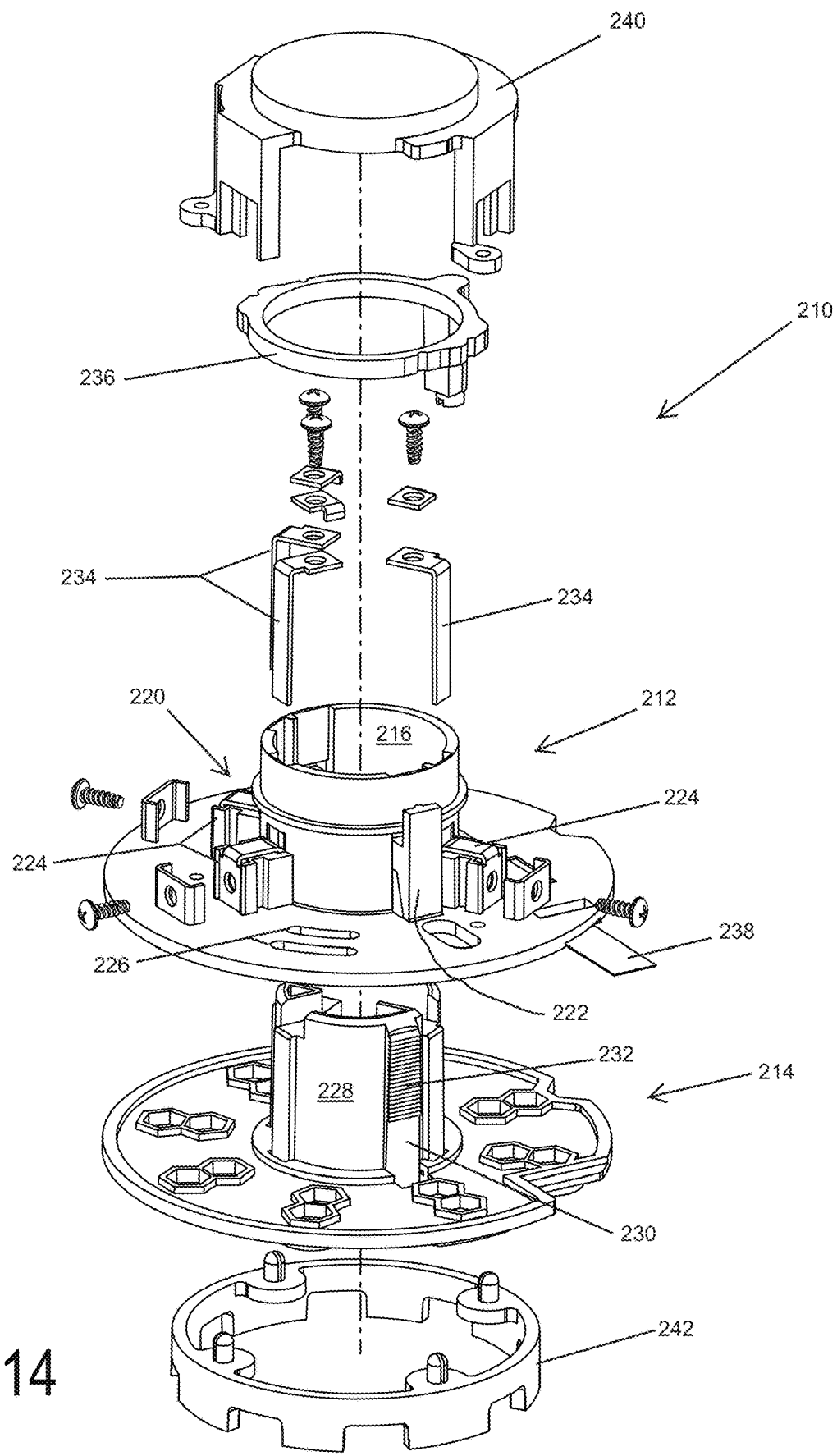
FIG. 14 is an exploded view of a mounting assembly according to another embodiment.

There is shown in FIGS. 14-19, with particular focus on FIG. 14, a mounting assembly 210 according to another embodiment. Components similar to components shown in FIGS. 1-13 have been labeled with similar identifiers.

The assembly 210 includes an upper unit 212 and a lower unit 214.

Figure 16:
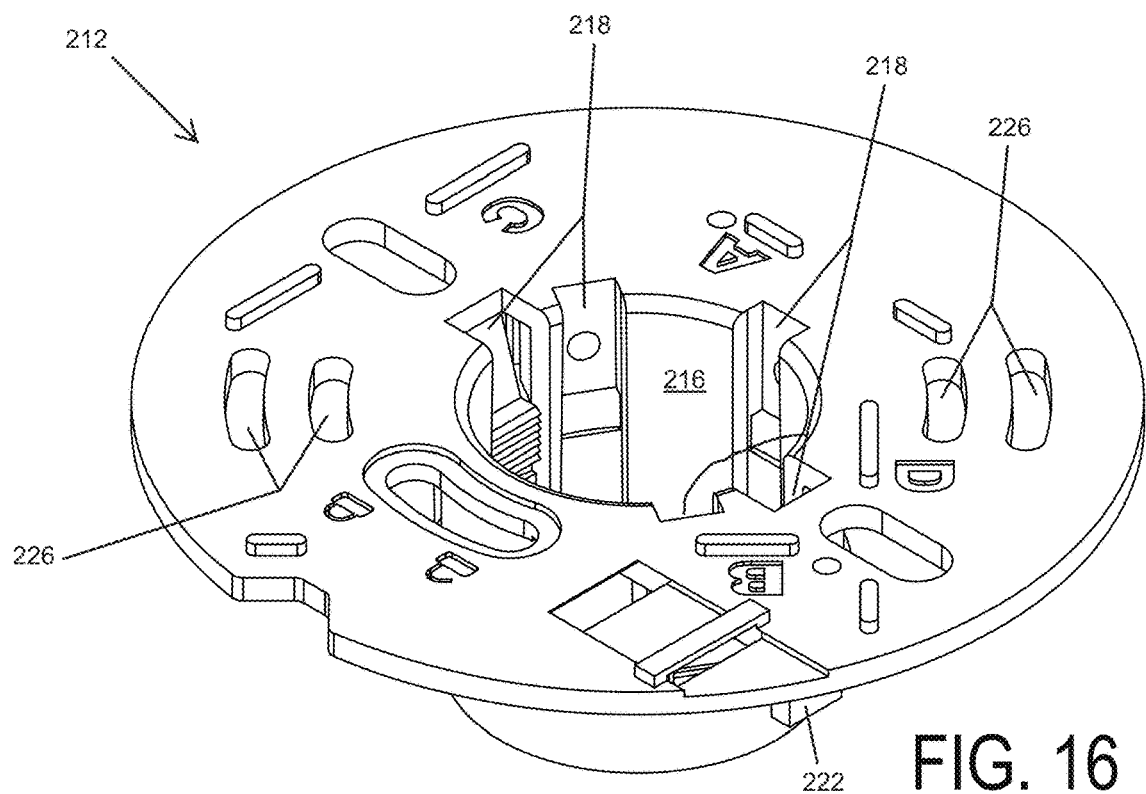
FIG. 16 is a bottom perspective view of the upper unit of FIG. 14.

The upper unit 212, also shown in FIG. 16 includes a longitudinal cavity 216. The cavity 216 may be tapered along the longitudinal axis. The cavity 216 includes optional longitudinal grooves 218.

The upper unit 212 includes a first portion 220 of a detent mechanism. The first portion 220 of the detent mechanism includes at least one finger 222.

The upper unit 212 includes at least one upper contact 224 for connection to a power source, a neutral or ground connection. The power source may be an AC power source or a DC power source.

The upper contacts 224 are illustrated as each being disposed in a respective groove 218. The upper contacts 224 are shown with optional associated clamp connectors with screws to facilitate connection of the power source, neutral, or ground connection.

The upper unit 212 is configured for connection to an electrical box, not shown. For example, the upper unit 212 includes apertures 226 configured for attachment to a corresponding electrical box or other mounting arrangement.

Figure 15:
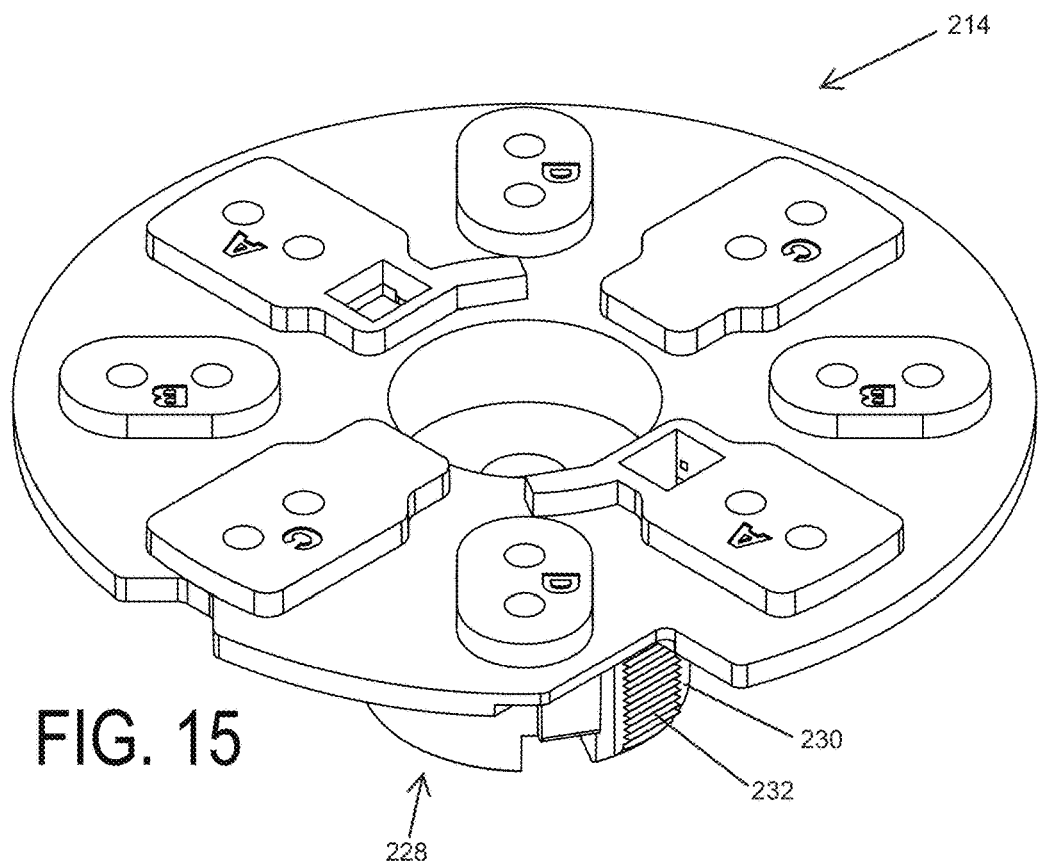
FIG. 15 is a bottom perspective view of the lower unit of FIG. 14.

The lower unit 214, also shown in FIG. 15, includes a longitudinal protrusion 228. The longitudinal protrusion 228 is disposed within the longitudinal cavity 216 when the upper unit 212 and lower unit 214 are retained together. The longitudinal protrusion 228 may be tapered.

The longitudinal protrusion includes optional splines 230. The spines are each disposed within a respective groove 218 when the upper unit 212 and lower unit 214 are retained together.

The lower unit 214 includes a second portion 232 of the detent mechanism. When the lower unit 214 engages the upper unit 212, the first portion 220 and the second portion 232 of the detent mechanism cooperate to releasably retain the upper unit and lower unit together, for example with a ratchet mechanism, such as an engaging tooth mechanism, or any other suitable mechanism to releasably retain the upper unit and lower unit together.

The lower unit 214 includes several pairs of apertures, labeled A, B, C, and D, to provide for the mounting of an electrical fixture, not shown, to the lower unit 214. The apertures A, B, C, and D, are provided such that fixtures of varying connections may be mated to the lower unit in appropriate configurations.

The lower unit 214 also includes at least one lower contact 234 for connection to the electrical fixture. When the lower unit 214 engages the upper unit 212 each upper contact 224 and lower contact 234 touch to create an electric pathway between the power source, neutral or ground and the electrical fixture. The lower contacts 234 are shown with optional associated clamp connectors with screws to facilitate connection of the electrical fixture lower contacts 234 for connection to the pathway to the power source, neutral, or ground connection.

As illustrated, each lower contact is disposed on a respective spline 230. However, it must be understood that the lower unit 214 may include grooves and the upper unit 212 may include splines with lower contacts disposed in grooves and upper contacts disposed on splines.

In the present example, when the upper unit 212 and the lower unit 214 are retained together the fingers 222 of the first portion 220 of the detent mechanism engage the second portion 232 of the detent mechanism. As illustrated, the first and second portions 220 and 232 of the detent mechanism include cooperating teeth for retention of the upper unit 212 and lower unit together 214.

Figure 18:
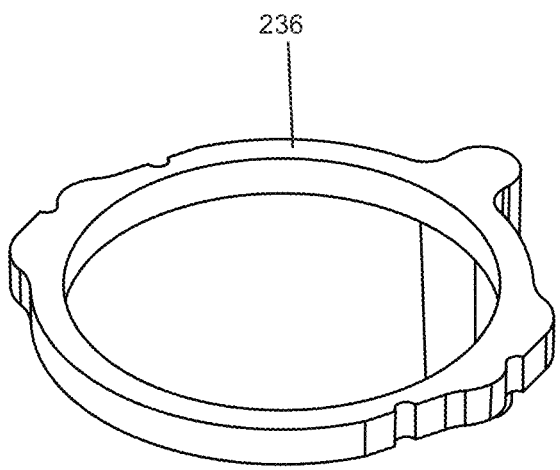
FIG. 18 is a top perspective view of the locking ring of FIG. 14.

A collet ring 236, also shown in FIG. 18, engages at least one finger 222 to maintain the retention of the upper unit 212 and lower unit together 214. The assembly 210 also includes a locking slide 238' to adjust the position of the collet ring 236. The locking slide 238' includes a pull strap. The pull strap is flexible and made from clear polyester, although such is not required. The strap may be used to move the locking slide 238'. In at least one exemplary installation, the strap may be tucked under the lower unit 214 to minimize the amount of strap extending from the assembly 210. In another exemplary installation, the strap may be cut or trimmed to diminish the extent to which the strap extends from the assembly 210.

Figure 17:
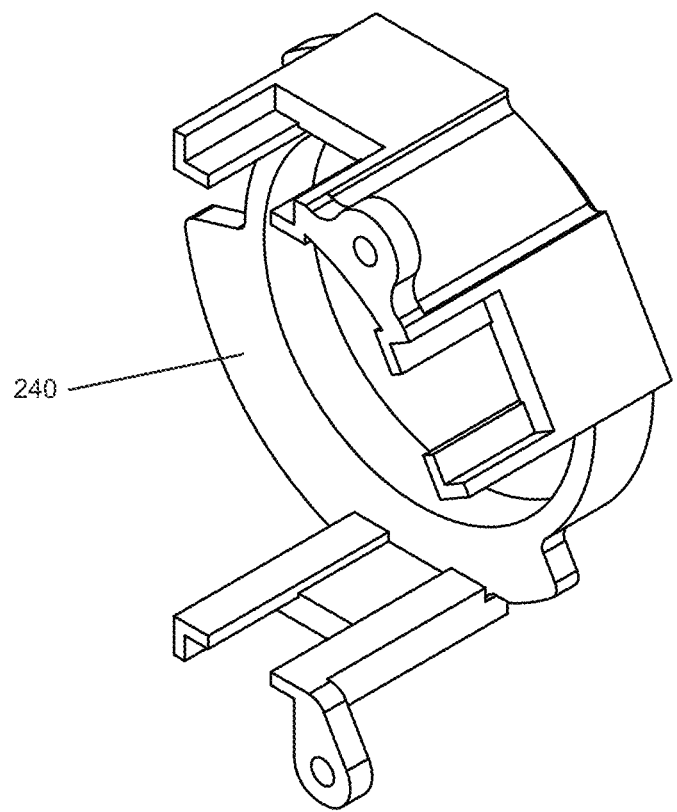
FIG. 17 is a side perspective view of the cap of FIG. 14.

The assembly 210 further includes an optional cap 240, also shown in FIG. 17. In at least one arrangement, the cap 240 provides a barrier at the end of the assembly to insulate the connectors 224 and 234 from something that may be beyond the cap 240. Further, in at least one other arrangement, the cap 240 may cover or protect some of the parts, for example particularly the moving parts, of the assembly 210, from something that may be beyond the cap 240.

Figure 19:
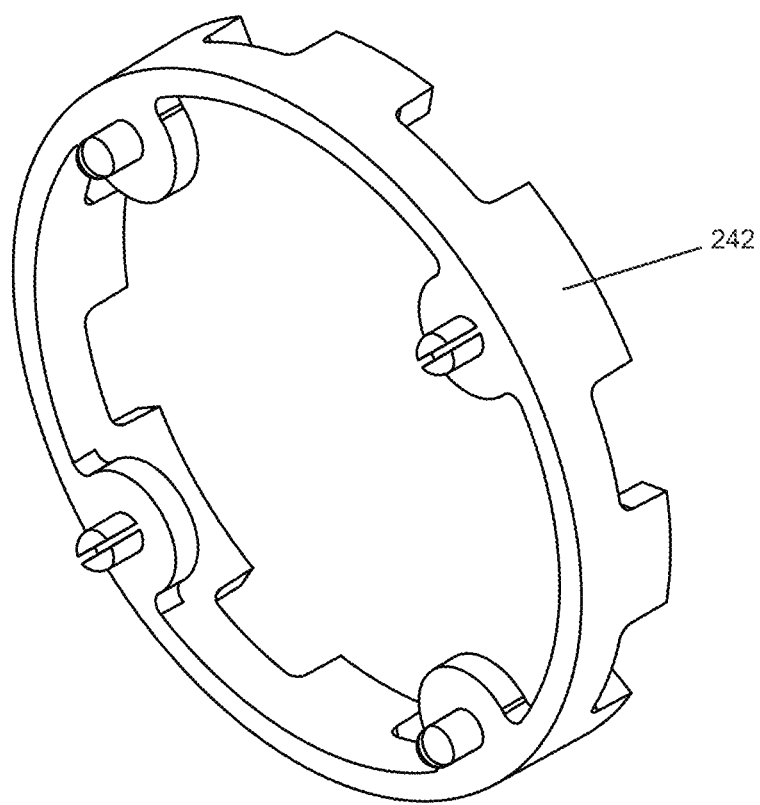
FIG. 19 is a side perspective view of the spacer of FIG. 14.
Figure 20:
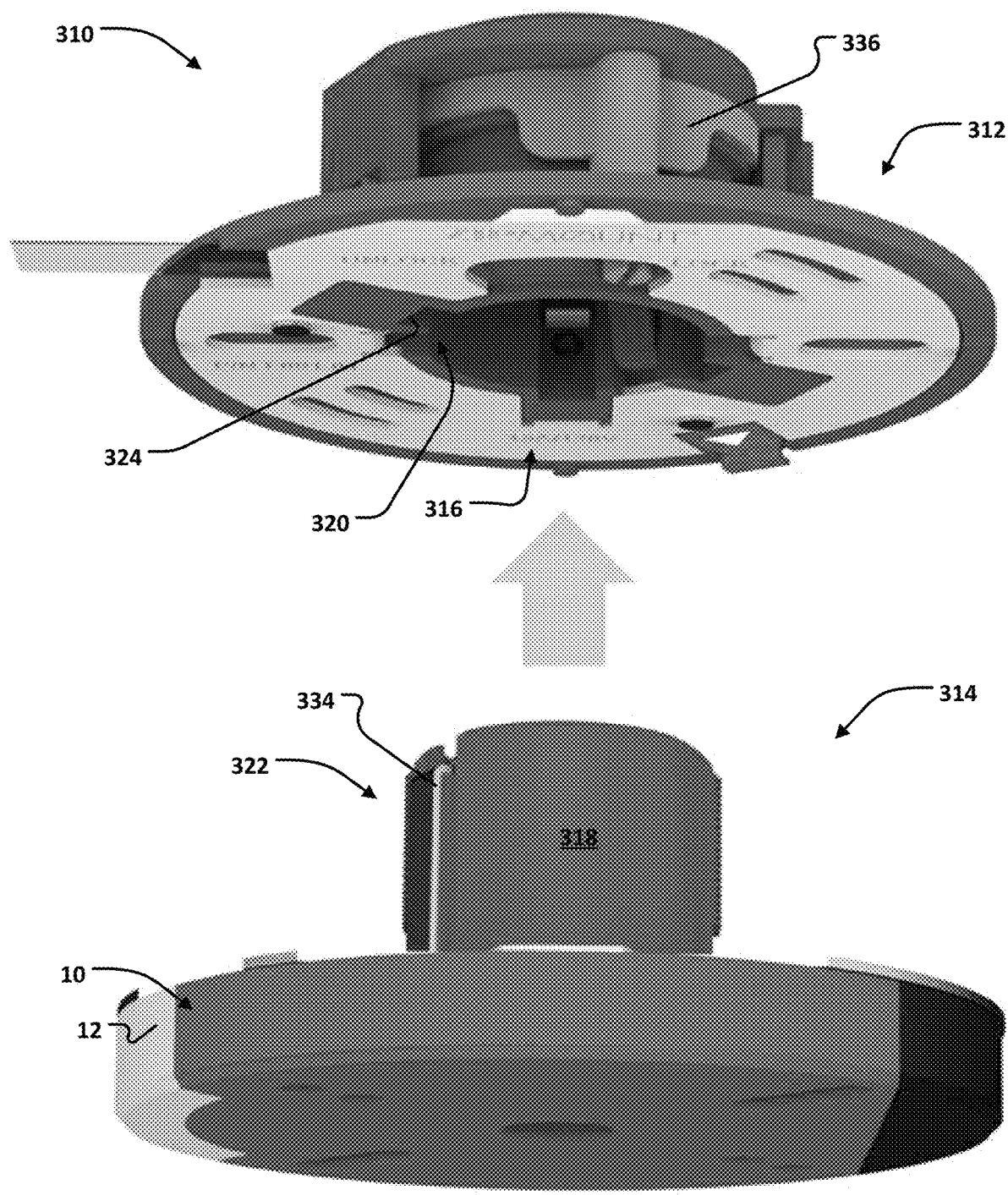
FIG. 20 is a partially-exploded view of an assembly according to an embodiment of the present disclosure.
Figure 21:
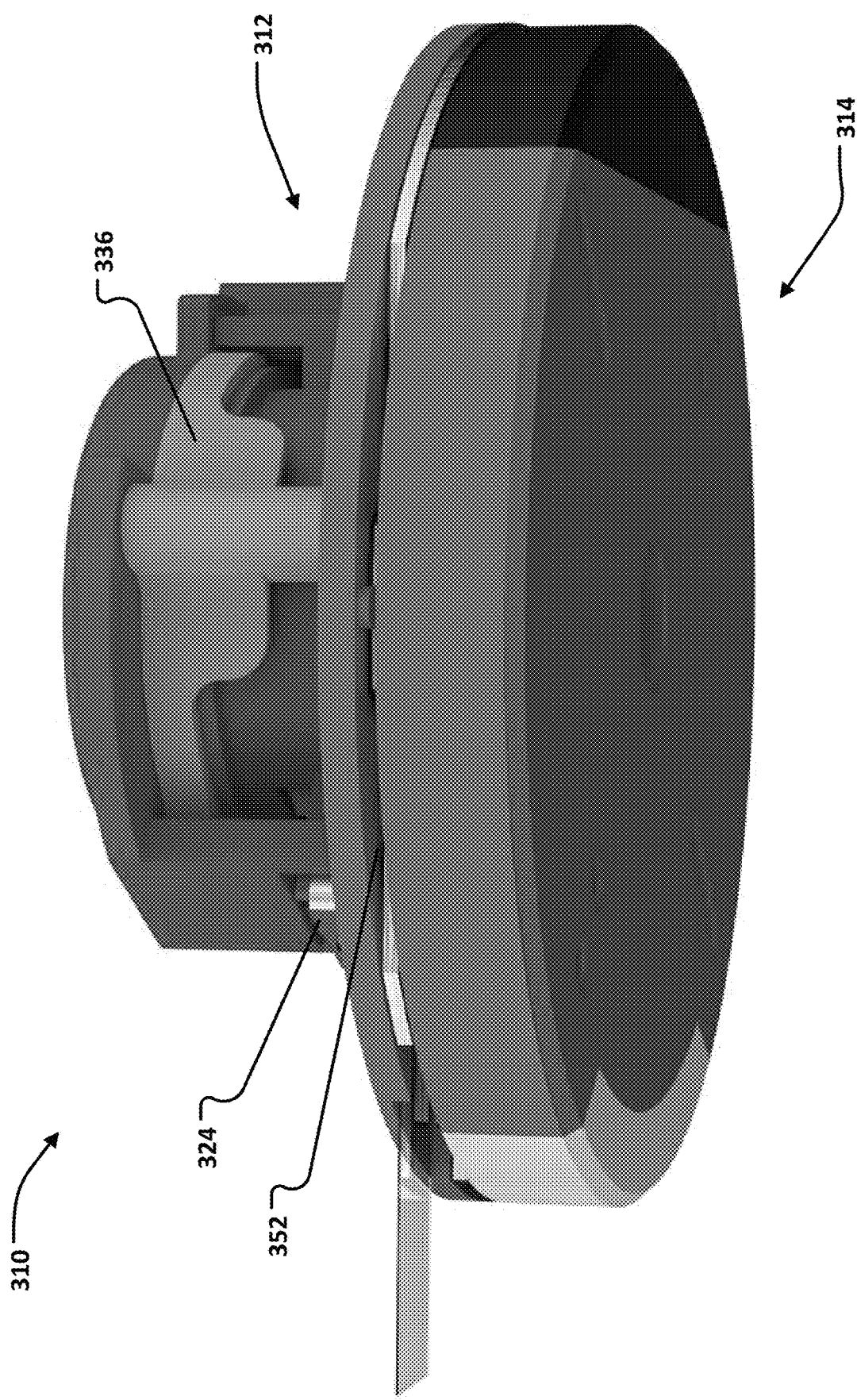
FIG. 21 is a perspective of the assembly shown in FIG. 20.
Figure 22:
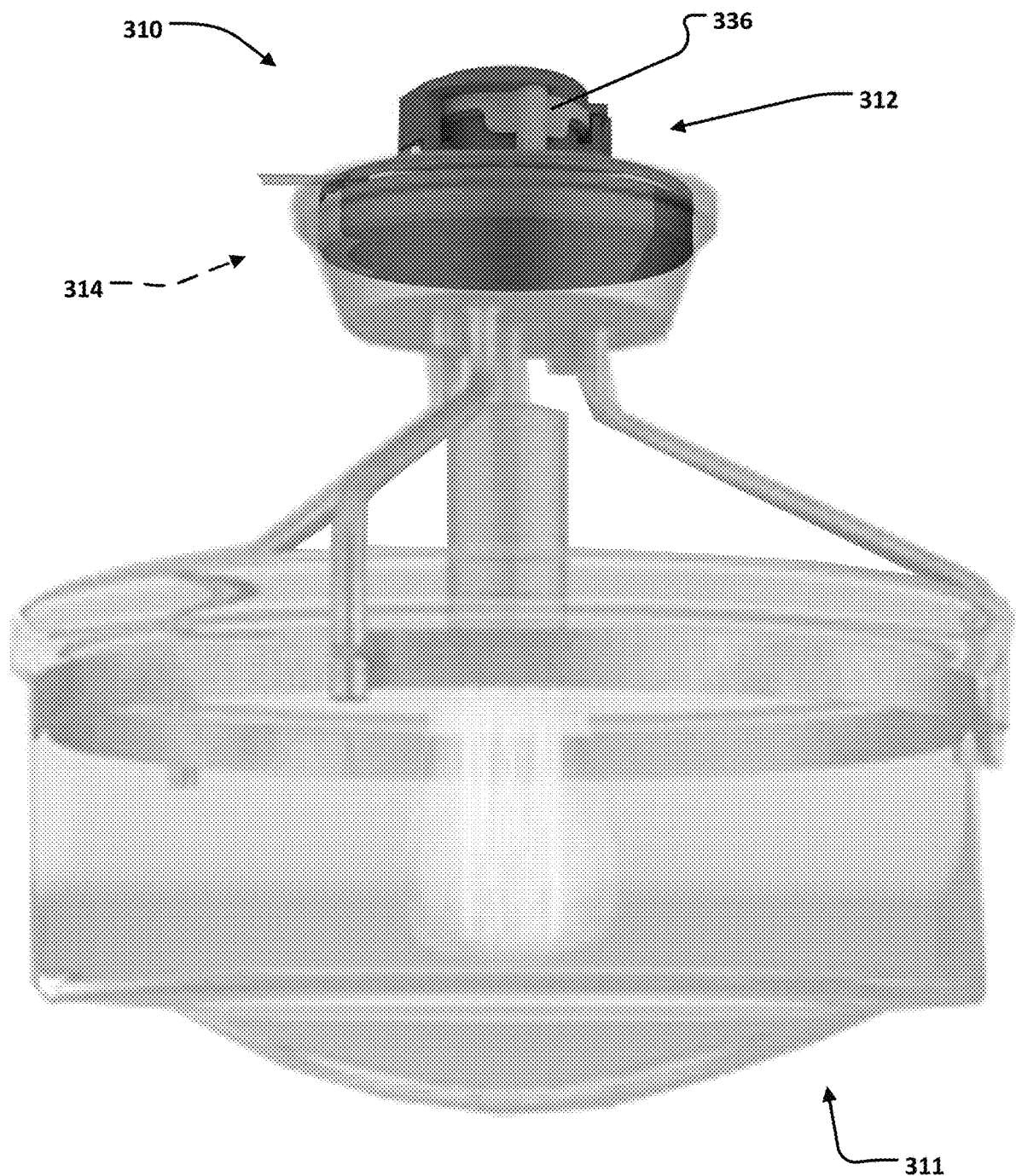
FIG. 22 is a perspective of the assembly shown in FIGS. 20 and 21 and further showing a light fixture suspended from the assembly.

The assembly 210 also includes an optional spacer 242, also shown in FIG. 19. The spacer 242 include optional prongs to engage with the apertures A, B, C, D. In one exemplary installation, the spacer 242 is disposed between the lower unit 214 and the electrical fixture to position the electrical fixture in a desired location relative to the assembly 210.

It must be understood that the assemblies 110 or 210 may be produced in a variety of detentions including several depths in profile. For example an assembly 110 or 210 may be produced to fit a variety of electrical boxes, such as what is commonly known as a standard box, deep box, or shallow box.

Referring now to FIGS. 20-25, a mounting assembly 310 for an electrical fixture 311 can include an upper unit 312 and a lower unit 314. The upper unit 312 can be mounted to a junction box (referenced schematically in FIG. 24 at 309), such as with fasteners. The upper unit 312 can include a first portion 320 of a detent mechanism and an upper contact 324 for connection to a power source. The lower unit 314 can be configured for connection to an electrical fixture 311 and include a second portion 332 of a detent mechanism and a lower contact 334 for connection to the electrical fixture 311. When the lower unit 314 engages the upper unit 312, the first portion 320 and the second portion 332 of the detent mechanism cooperate to releaseably retain the upper unit 312 and the lower unit 314 together and the upper contact 324 and the lower contact 334 touch to create an electric pathway between the power source and the electrical fixture 311. The upper unit 312 further includes a second upper contact 325 for a neutral or ground connection and the lower unit 314 further includes a second lower contact 335 for connection to the electrical fixture 311. When the lower unit 314 engages the upper unit 312, the second upper contact 325 and the second lower contact 335 touch to create a second electric pathway, a grounding pathway, between the ground or neutral and the electrical fixture 311.

The exemplary upper unit 312 includes a longitudinal cavity 316. The exemplary lower unit 314 includes a longitudinal protrusion 318. The exemplary longitudinal protrusion 318 can be disposed within the longitudinal cavity 316 when the upper unit 312 and the lower unit 314 are retained together.

The exemplary upper unit 312 can also include where the first portion of the detent mechanism includes at least one finger for engaging the second portion of the detent mechanism. Exemplary fingers are referenced at 122 and 222. The exemplary upper unit 312 can also include a collet ring 336 that engages the at least one finger to maintain the upper unit 312 and the lower unit 314 together.

Figure 23:
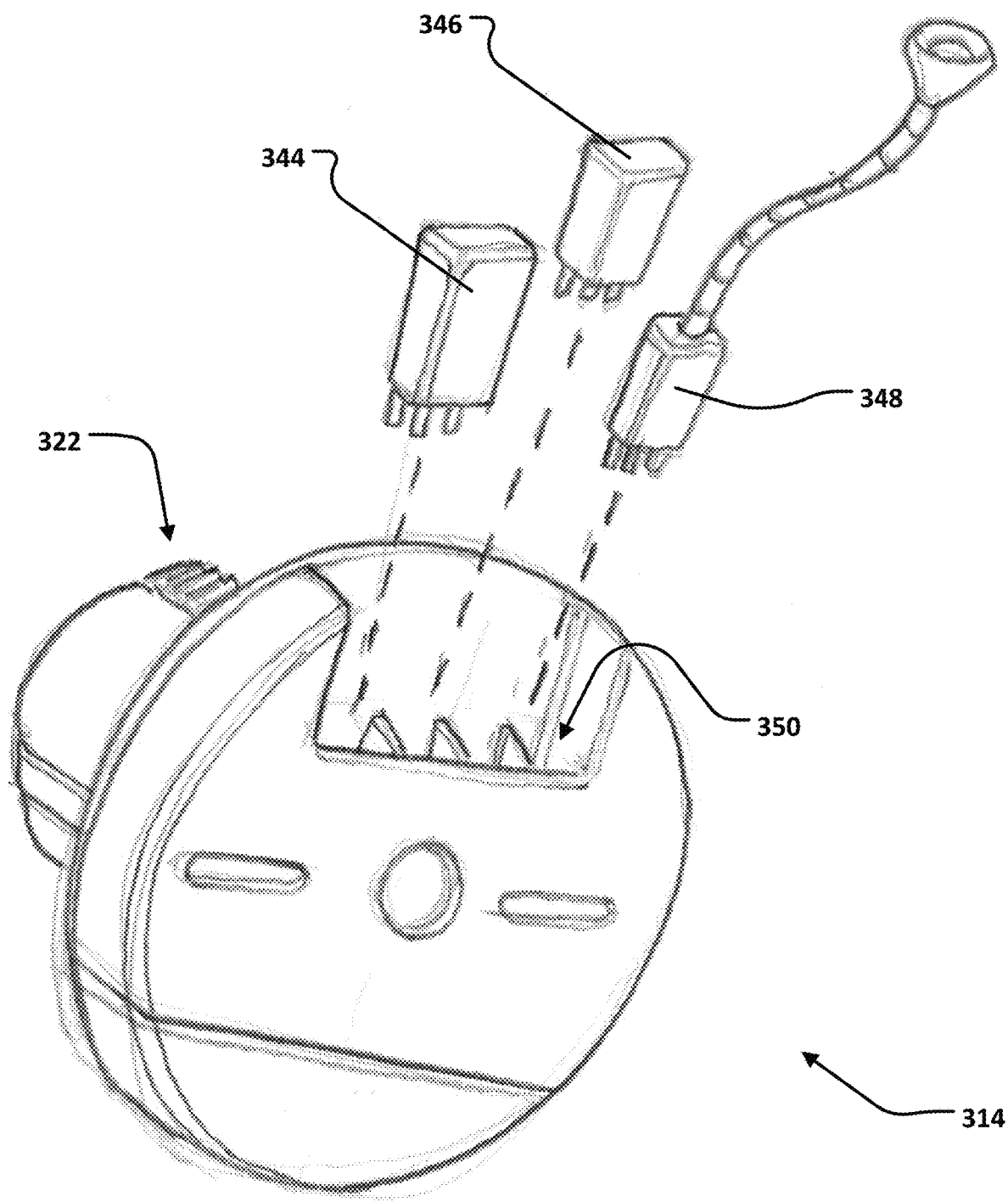
FIG. 23 is a partially-exploded view a lower unit according to embodiment shown in FIGS. 20-22.

The exemplary mounting assembly 310 can also include at least one device in electrical contact with both of the lower contact 334 and the second lower contact 335. The at least one device is configured to draw power through the upper contact 324 and the lower contact 334. In one or more embodiments, a plurality of devices can be connected to the lower unit 314 and be configured to draw power through the upper contact 324 and the lower contact 334. As shown in FIG. 23, the at least one device can be a sensor 344, such as temperature sensor, a smoke sensor, a motion sensor, or an air quality sensor. The at least one device can be a transceiver 346. Either the sensor 344 or the transceiver 344 can include a processor or a processor can be retained in the lower unit 314, wherein the processor can receive data from the sensor 344 and transmit the data to other devices with the transceiver. The protocol for communication can be WiFi, BLE, BT-Classic, Zigbee, Z-Wave, or some other proprietary protocol. The at least one device can be a camera 348, a speaker, a microphone, or a small light such as a "night" light.

FIG. 23 also shows that, in one or more embodiments of the present disclosure, a plurality of sockets can be mounted or fixed in the lower unit 314. Three exemplary sockets are shown, one referenced at 350. Each socket can include a positive lead connected to the lower contact 334 and a negative lead connected to the second lower contact 335. The devices 344 346, 348 can include respective plugs and each of the plurality of plugs individually received in one of the plurality of sockets.

An annular gap 352 can be defined between the upper unit 312 and the lower unit 314. Portions of the devices 344, 346, 348 can protrude through the annular gap 352. For example, a probe of the sensor 344, an antenna of the transceiver 346, or an arm of the camera 348 or microphone can extend through the gap 352 to enhance performance of the respective devices 344, 346, 348.

Figure 24:
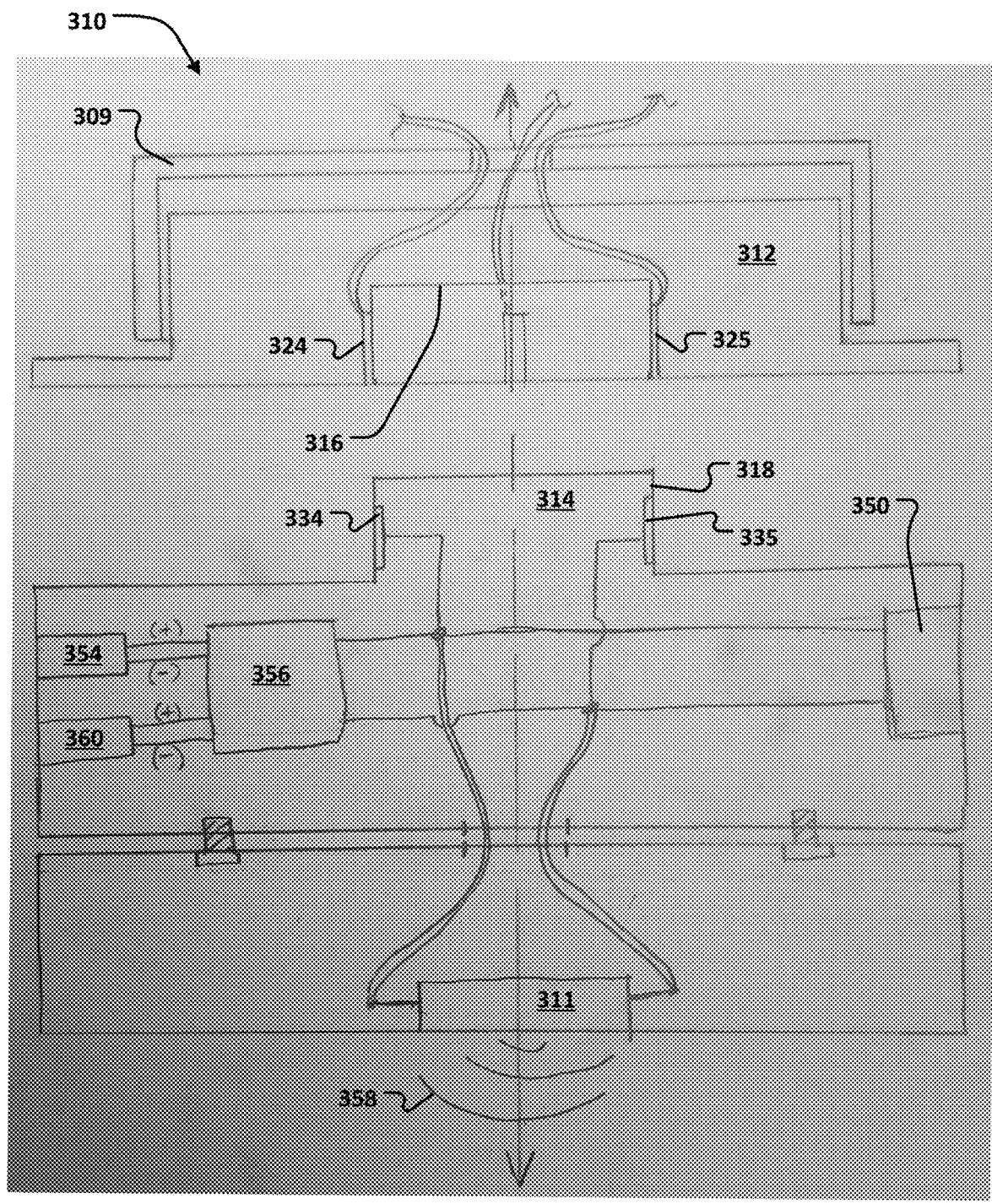
FIG. 24 is schematic of an electrical distribution arrangement of the embodiment shown in FIGS. 20-23.

As show in FIG. 24, the exemplary lower unit 314 also includes a third lower contact 354. The exemplary third lower contact 354 is shown schematically and includes positive and negative leads. The exemplary lower unit 314 also includes a power distribution circuit 356 disposed between lower contact 334 and the third lower contact 354. The power distribution circuit 356 is also in electrical connection with the grounding contact 335. The power distribution circuit 356 can be an integrated circuit on a chip or a circuit formed from discrete elements assembled together. The power distribution circuit 356 can be configured to deliver a level of electrical power to the third lower contact 354 that is different than a level of electrical power received by the power distribution circuit 356 from the upper contact 324 through the lower contact 334.

A first device, such as the light fixture 311, could be placed in electrical contact with both of the lower contact 334 and the second lower contact 335. The first device 311 can be configured to draw power directly through the upper contact 324 and the lower contact 334. The first device 311 is configured to emit light (referenced at 358. A second device, such as sensor 344, can be in electrical contact with both of the third lower contact 354 and the second lower contact 335. The exemplary sensor 344 can be in electrical contact with both of the third lower contact 354 and the second lower contact 335 through the power distribution circuit 356. The second device 344 can be configured to draw power through the third lower contact 354 and the power distribution circuit 356. The exemplary second device 344 is not configured to emit light.

The exemplary lower unit 314 also includes a fourth lower contact 360. The exemplary power distribution circuit 356 is disposed between the lower contact 334 and the fourth lower contact 360. The exemplary power distribution circuit 356 configured to deliver a level of electrical power to the fourth lower contact 360 that is different than the level of electrical power received by the power distribution circuit 356 from the upper contact 324 through the lower contact 334 and is also different than the level of electrical power supplied to the third lower contact 354 by the power distribution circuit 356. A third device, such as the camera 348, can be in electrical contact with both of the fourth lower contact 360 and the second lower contact 335. The third device 348 can be configured to draw power through the fourth lower contact 360 and the power distribution circuit 356. The exemplary third device 348 is not configured to emit light.

A processor and memory can be mounted in the lower unit 314 and control the light fixture 311 or other devices connected to the lower unit 314. For example, sound detected through a microphone connected to the lower unit 314 could be processed with speech recognition software, resulting in a change in the control of the light fixture 311. A user could command the light fixture 311 to activate through a voice command. In another example, a lack of light detected through a sensor connected to the lower unit 314 could be processed and result in activation of the light fixture 311. The processor could be part of the power distribution circuit 356.

Figure 25:
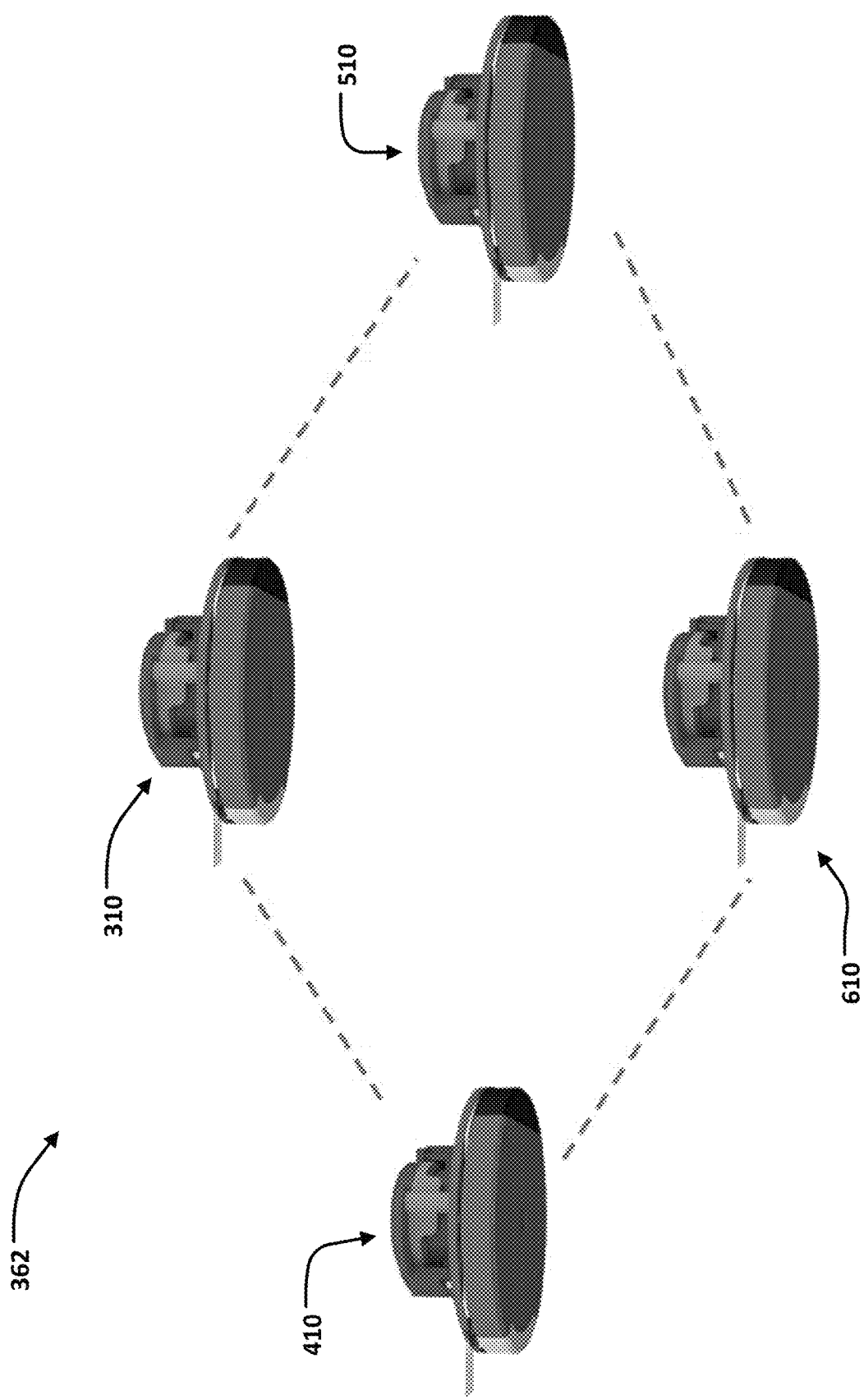
FIG. 25 illustrates a system of mounting assemblies communicating with one another as a nodal network.

FIG. 25 illustrates a system 362 of mounting assemblies 310, 410, 510, 610 communicating with one another as a nodal network. Each of the mounting assemblies 310, 410, 510, 610 is similar to one another and include respective upper units and lower units configured as described above. The exemplary plurality of mounting assemblies 310, 410, 510, 610 are configured to communicate with one another through respective transceivers. Each mounting assemblies 310, 410, 510, 610 can be equipped with different peripherals. For example, a first one of the mounting assemblies 310, 410, 510, 610 can support a sensor. A second of the mounting assemblies 310, 410, 510, 610 can support a camera.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined strictly by the content of a patent claim and not by what is written in a detailed description of an embodiment of an invention.

What is claimed is:

1. A mounting assembly for an electrical fixture comprising:
   an upper unit including a first portion of a detent mechanism and an upper contact for connection to a power source; and
   a lower unit configured for connection to an electrical fixture and including a second portion of a detent mechanism and a lower contact for connection to the electrical fixture;
   wherein, when said lower unit engages said upper unit, said first portion and said second portion of said detent mechanism cooperate to releaseably retain said upper unit and said lower unit together and said upper contact and said lower contact touch to create an electric pathway between the power source and the electrical fixture;
   wherein said upper unit further includes a second upper contact for a neutral or ground connection and said lower unit further includes a second lower contact for connection to the electrical fixture, wherein when said lower unit engages said upper unit said second upper contact and said second lower contact touch to create a second electric pathway between the ground or neutral and the electrical fixture; and
   at least one device in electrical contact with both of said lower contact and said second lower contact, said at least one device configured to draw power through said upper contact and said lower contact.

2. The assembly of claim 1 wherein said upper unit includes a longitudinal cavity and said lower unit includes a longitudinal protrusion, wherein said longitudinal protrusion is disposed within said longitudinal cavity when said upper unit and said lower unit are retained together.

3. The assembly of claim 1 wherein:
   said first portion of said detent mechanism includes at least one finger; and
   said upper unit further includes a collet ring that engages said at least one finger to maintain said upper unit and said lower unit together.

4. The assembly of claim 1 wherein said at least one device is further defined as a plurality of devices.

5. The assembly of claim 4 further comprising:
   a plurality of sockets each having a positive lead connected to said lower contact and a negative lead connected to said second lower contact; and
   a plurality of plugs respectively defined for at least some of said plurality of devices, each of said plurality of plugs individually received in one of said plurality of sockets.

6. The assembly of claim 1 wherein said at least one device is further defined as at least including a sensor.

7. The assembly of claim 1 wherein said at least one device is further defined as at least including a transceiver.

8. The assembly of claim 1 wherein said at least one device is further defined as one of a camera and a speaker.

9. The assembly of claim 1 wherein an annular gap is defined between said upper unit and said lower unit and wherein a portion of said at least one device protrudes through said annular gap.

10. A mounting assembly for an electrical fixture comprising:
- an upper unit including a first portion of a detent mechanism and an upper contact for connection to a power source; and
- a lower unit configured for connection to an electrical fixture and including a second portion of a detent mechanism and a lower contact for connection to the electrical fixture;
- wherein, when said lower unit engages said upper unit, said first portion and said second portion of said detent mechanism cooperate to releaseably retain said upper unit and said lower unit together and said upper contact and said lower contact touch to create an electric pathway between the power source and the electrical fixture;
- wherein said upper unit further includes a second upper contact for a neutral or ground connection and said lower unit further includes a second lower contact for connection to the electrical fixture, wherein when said lower unit engages said upper unit said second upper contact and said second lower contact touch to create a second electric pathway between the ground or neutral and the electrical fixture;
- wherein said lower unit further includes a third lower contact; and
- a power distribution circuit disposed between said lower contact and said third lower contact, said power distribution circuit configured to deliver a level of electrical power to said third lower contact that is different than a level of electrical power received by said power distribution circuit from said upper contact through said lower contact.

11. The assembly of claim 10 wherein said upper unit includes a longitudinal cavity and said lower unit includes a longitudinal protrusion, wherein said longitudinal protrusion is disposed within said longitudinal cavity when said upper unit and said lower unit are retained together.

12. The assembly of claim 10 wherein:
- said first portion of said detent mechanism includes at least one finger; and
- said upper unit further includes a collet ring that engages said at least one finger to maintain said upper unit and said lower unit together.

13. The assembly of claim 10 further comprising:
- a first device in electrical contact with both of said lower contact and said second lower contact, said first device configured to draw power through said upper contact and said lower contact.

14. The assembly of claim 13 wherein said first device is further defined as configured to emit light.

15. The assembly of claim 14 further comprising:
- a second device in electrical contact with both of said third lower contact and said second lower contact, said second device configured to draw power through said third lower contact and said power distribution circuit.

16. The assembly of claim 15 wherein said second device is further defined as not configured to emit light.

17. The assembly of claim 16 wherein:
- said lower unit further includes a fourth lower contact; and
- said power distribution circuit is further defined as disposed between said lower contact and said fourth lower contact, said power distribution circuit configured to deliver a level of electrical power to said fourth lower contact that is different than the level of electrical power received by said power distribution circuit from said upper contact through said lower contact and is also different than the level of electrical power supplied to said third lower contact by said power distribution circuit.

18. The assembly of claim 17 further comprising:
- a third device in electrical contact with both of said fourth lower contact and said second lower contact, said third device configured to draw power through said fourth lower contact and said power distribution circuit, said third device further defined as not configured to emit light.

19. The assembly of claim 10 wherein:
- said lower unit further includes a fourth lower contact; and
- said power distribution circuit is further defined as disposed between said lower contact and said fourth lower contact, said power distribution circuit configured to deliver a level of electrical power to said fourth lower contact that is different than the level of electrical power received by said power distribution circuit from said upper contact through said lower contact and is also different than the level of electrical power supplied to said third lower contact by said power distribution circuit.

20. A system of mounting assemblies for electrical fixtures comprising:
- a plurality of mounting assemblies, each of said mounting assemblies including:
  - an upper unit including a first portion of a detent mechanism and an upper contact for connection to a power source;
  - a lower unit configured for connection to an electrical fixture and including a second portion of a detent mechanism and a lower contact for connection to the electrical fixture;
  - wherein when said lower unit engages said upper unit said first portion and said second portion of said detent mechanism cooperate to releaseably retain said upper unit and said lower unit together and said upper contact and lower contact touch to create an electric pathway between said power source and the electrical fixture;
  - wherein said upper unit further includes a second upper contact for a neutral or ground connection and said lower unit further includes a second lower contact for connection to the electrical fixture, wherein when said lower unit engages said upper unit said second upper contact and said second lower contact touch to create a second electric pathway between the ground or neutral and the electrical fixture; and
  - a transceiver drawing power through said upper contact and said lower contact; and
- whereby said plurality of mounting assemblies are configured to communicate with one another through said respective transceivers.

* * * * *